United States Patent
Brucculeri

(10) Patent No.: US 12,172,073 B2
(45) Date of Patent: Dec. 24, 2024

(54) METHOD, APPARATUS, GUIs AND APIs FOR A USER EXPERIENCE DESIGN RELATED TO HANDS-FREE GAMING ACCESSIBILITY

(71) Applicant: Andrea Joy Brucculeri, Raleigh, NC (US)

(72) Inventor: Andrea Joy Brucculeri, Raleigh, NC (US)

(*) Notice: Subject to any disclaimer, the term of this patent is extended or adjusted under 35 U.S.C. 154(b) by 324 days.

(21) Appl. No.: 17/648,930

(22) Filed: Jan. 25, 2022

(65) Prior Publication Data
US 2022/0241688 A1    Aug. 4, 2022

Related U.S. Application Data

(60) Provisional application No. 63/143,642, filed on Jan. 29, 2021.

(51) Int. Cl.
*A63F 13/44* (2014.01)
*G02B 27/01* (2006.01)
*G06F 3/01* (2006.01)

(52) U.S. Cl.
CPC .......... *A63F 13/44* (2014.09); *G02B 27/0179* (2013.01); *G06F 3/011* (2013.01); *G02B 2027/0187* (2013.01)

(58) Field of Classification Search
CPC .......... A63F 13/12; A63F 13/30; A63F 13/70; A63F 13/73; A63F 13/79; G06Q 30/0207; G06Q 30/0208; G06Q 30/0209; G09B 1/00
See application file for complete search history.

(56) References Cited

U.S. PATENT DOCUMENTS

| | | | | |
|---|---|---|---|---|
| 6,684,062 B1 * | 1/2004 | Gosior | ........... | A63F 13/20 455/66.1 |
| 7,704,135 B2 * | 4/2010 | Harrison, Jr. | ........... | A63F 13/40 463/2 |
| 9,254,437 B2 * | 2/2016 | Short | ........... | A63F 13/00 |
| 9,795,884 B2 * | 10/2017 | Short | ........... | A63F 13/212 |
| 10,220,304 B2 * | 3/2019 | Palotas | ........... | A63F 13/213 |

(Continued)

OTHER PUBLICATIONS

Juul, Jesper, "A Casual Revolution: Reinventing Video Games and Their Players," MIT Press, 2012, pp. 509-511.

(Continued)

*Primary Examiner* — Chase E Leichliter
(74) *Attorney, Agent, or Firm* — Keith Lutsch PC

(57) ABSTRACT

The technology necessary for hands-free video gaming is available, especially for head-gesture-centric controls. However, remapping controls to head gestures ranges from frustratingly tedious to impossible. The inventor proposes a common language of gestures and game actions that categorizes the controls by their use frequency. The suggested categories are primary, secondary, tertiary, and quaternary. The most preferred gestures and more frequently used controls are classified as primary while the least preferred gestures and least frequently used controls classified as quaternary. The inventor also proposes constructing an interface software and API to gather data from game designers, hardware designers, and users to suggest optimized game controls for users requiring accessibility.

18 Claims, 21 Drawing Sheets

Accessibility Controls

Right eye open
Right eye closed
Gaze angle of right eye
Smile present
Top lip recessed
Two-dimensional head position
Three-dimensional head position

- Objective (e.g., empirical) game data
- Subjective (e.g., survey / Q&A) gave data
- Hardware Data
- Subjective user data
- Empirical user data (e.g., from test play or game play)

Traditional Controls / Other Hardware

LSB
LB
LT
D Pad
RSB
RT
RB
Accelerometer 1
Camera 1

How the interface software uses the collected data to correlate controls

(56) References Cited

U.S. PATENT DOCUMENTS

| | | | |
|---|---|---|---|
| 2002/0077534 A1* | 6/2002 | DuRousseau | G06F 3/015 600/595 |
| 2013/0288777 A1* | 10/2013 | Short | A63F 13/212 463/23 |
| 2015/0141136 A1* | 5/2015 | Ahuja | A63F 13/49 463/29 |
| 2016/0117029 A1* | 4/2016 | Short | G16H 10/60 463/31 |
| 2016/0209968 A1* | 7/2016 | Taylor | G06F 3/0416 |
| 2019/0265802 A1* | 8/2019 | Parshionikar | G06F 3/012 |
| 2020/0249752 A1* | 8/2020 | Parshionikar | G06F 3/016 |
| 2022/0241688 A1* | 8/2022 | Brucculeri | A63F 13/44 |

OTHER PUBLICATIONS

Wardrip-Fruin, Noah, Harrigan, Pat; "First Person: New Media as Story, Performance, and Game," The MIT Press, 2006, p. 117.

Ablegamers Charity, "AbleGamers and Gamers Outreach Partner to Help Children with Disabilities in Need," The AbleGamers Charity, 2017, ablegamers.org/ablegamers-and-gamers-outreach-partner-to-help-children-with-disabilities-in-need/.

Dotsenko, Andrew, "Designing Game Controls," Game Design Framework, Mar. 28, 2017, gamedesignframework.net/designing-game-controls/.

Casual Games Association, "Faq"CGA :: Casual Games Association, Feb. 2009, web.archive.org/web/20090217221337/casualgamesassociation.org/faq.php#casualgames.

Verplancke, Annika, "A face dance," Instagram, May 27, 2020, https://www.instagram.com/p/CAsfZoIAHRj/.

Russworm, Treaandrea M., "Computational Blackness: The Procedural Logics of Race, Game, and Cinema, or How Spike Lee's Livin' Da Dream Productively 'Broke' a Popular Video Game," Black Camera, vol. 10, No. 1, 2018, pp. 193-212.

Wynne, Kelly, "Here's Why 'Animal Crossing' Is Great for Your Mental Health Right Now," Newsweek, Mar. 26, 2020, www.newsweek.com/animal-crossing-new-horizons-great-your-mental-health-through-covid-19- professionals-say-1494525.

Pierre-Louis, Stanley, "ESA Leadership Desk: 214 Million Americans Play Video Games." Entertainment Software Association, Entertainment Software Association, Jul. 15, 2020, www.theesa.com/perspectives/214-million-americans-play-video-games/.

Bailenson, Jeremy, "Experience on Demand: What Virtual Reality Is, How It Works, and What It Can Do," W. W. Norton & Company, Inc., 2019.

Glaubke, Christina R, Miller, Patti; Parker, McCrae A.; Espejo, Eileen; "Fair Play? Violence, Gender and Race in Video Games," Children Now, Oakland, CA., 2001.

Shen, Szu-Ching, "Incidence, Risk, and Associated Factors of Depression in Adults with Physical and Sensory Disabilities: A Nationwide Population-Based Study," US National Library of Medicine, 2017.

Leonard, David, "Live in Your World, Play in Ours': Race, Video Games, and Consuming the Other," SIMILE Studies in Media Information Literacy Education, vol. 3, No. 4, Nov. 2003.

Stoner, Grant, "How Accessibility Consultants Are Building a More Inclusive Video Game Industry behind the Scenes," The Washington Post, WP Company, Feb. 25, 2020, www.washingtonpost.com/video-games/2020/02/25/how-accessibility-consultants-are-building-more-inclusive-video-game-industry-behind-scenes/.

Downs, Edward, Smith Stacy L.; "Keeping Abreast of Hypersexuality: a Video Game Character Content Analysis," Sex Roles, vol. 62, No. 11-12, 2009, pp. 721-733.

Editorial Team, "Global Video Game Consumer Population Passes 3 Billion." DFC Intelligence, DFC Intelligence, Aug. 14, 2020, www.dfcint.com/dossier/global-video-game-consumer-population/.

Csikszentmihalyi, Mihaly, "Flow: the Psychology of Optimal Experience," Harper Row, 2009, p. 4.

Holmes, Kat, "Mismatch: How Inclusion Shapes Design," The MIT Press, 2020.

Lien, Tracey, "No Girls Allowed," Polygon, Vox Media, Dec. 2, 2013, www.polygon.com/features/2013/12/2/5143856/no-girls-allowed.

Leonard, David, "Performing Blackness: Virtual Sports and Becoming the Other in an Era of White Supremacy," Re:Skin, by Mary Flanagan and Austin Booth, MIT Press, 2006, pp. 321-323.

United States Department of Labor, Bureau of Labor Statistics; "Persons with a Disability: Labor Force Characteristics—2019," Bureau of Labor Statistics, 2020, pp. 1-2.

Jerald, Jason, "The VR Book: Human-Centered Design for Virtual Reality," ACM Books, 2016.

Salen, Katie, Zimmerman, Eric; "Rules of Play: Game Design Fundamentals," The MIT Press, 2010, p. 11.

Center for Universal Design, "The 7 Principles," Centre for Excellence in Universal Design, National Disability Authority, 2020, universaldesign.ie/What-is-Universal-Design/The-7-Principles/.

McGonigal, Jane, "Reality Is Broken: Why Games Make Us Better and How They Can Change the World," Vintage, 2012, pp. 20, 21, 33, 43, 49, 50.

Avedon, Elliott M., Sutton-Smith Brian; The Study of Games. Wiley, 1971, pp. 401-407.

Miller, Hawken, "It's My Escape.' How Video Games Help People Cope with Disabilities," The Washington Post, WP Company, Dec. 10, 2019, www.washingtonpost.com/video-games/2019/10/14/its-my-escape-how-video-games-help-people-cope-with-disabilities/.

Cote, Amanda C., "Writing 'Gamers.'" Games and Culture, vol. 13, No. 5, 2015, pp. 479-503.

* cited by examiner

Vive Cosmos VR headset and controllers, 2020

Oculus Quest VR ad for Beat Saber

Arca's Path VR Screenshot from its Steam profile page

Eyeflite Ava, screenshot taken from the "Intro to Ava" YouTube video

The Six Degrees of Freedom

Pupil glowing in near-infrared / infrared light

MouseGrid demonstration, part one

MouseGrid demonstration, part two

Quadstick FPS gaming controller

Link attacking an enemy with his sword

How a player can use Cancel
to end a conversation

The Pause / Inventory screen in BOTW

Preparing to Use Green Shell Item
in Mario Kart 8

Drifting in Mario Kart 8

Dotsenko's Finger Groups

Dotsenko's Xbox button tiers

GameCube Controller, 2001

Nintendo Switch Pro Controller, 2016

Nintendo Switch Pro Controller Map, Front

Nintendo Switch Pro Controller Map, Back

Start screen of eye-tracking game

Eye-tracking game gameplay, Level 2

Eye-tracking game gameplay, Level 9

Eye-tracking game end screen

The three data sources interacting with the interface software

Illustration of an Xbox controller (Game;Game Mode;Controller;[Column definition fields];[Row definition fields]), Or (Game;Game Mode;Controller;[Column definition field X];[Corresponding row definition field X])

Sample API formats

Illustration of model accepting data sources

How the interface software uses the collected data to correlate controls

High-level model flow chart

Reduce to relevant controls

| Eliminate irrelevant or unused traditional controls and hardware from consideration |

| Eliminate irrelevant or unused accessibility controls and hardware from consideration |

Reduce to relevant controls nested flow chart

Figure 31

Align multi-dimensional controls

| Determine game-necessary multi dimensional controls |

| Determine available accessibility controls with matching dimensional ability |

| Apply user mandates and rules from prior attempts |

| Align controls |

Align multi-dimensional controls nested flow chart

Figure 32

Align binary controls nested flow chart

SSB Playable Character Gender Breakdown

SSB Playable Character % Gender Breakdown

SSB Playable Character Gender Appearance Breakdown

SSB Playable Character % Gender Appearance Breakdown

METHOD, APPARATUS, GUIs AND APIs FOR A USER EXPERIENCE DESIGN RELATED TO HANDS-FREE GAMING ACCESSIBILITY

CROSS-REFERENCE

This application claims priority to U.S. Provisional Application Ser. No. 63/143,642, filed Jan. 29, 2021, the contents of which are incorporated herein in their entirety by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates generally to video games and controls therefor.

BACKGROUND

Over 3 billion people play video games. That number captures people of all ages playing on consoles, computers and smartphones from all over the world, and the industry is showing no signs of slowing down. An ESA survey estimates that 214 million Americans play video games, including 65% of adults, with one of the many reasons being that they help foster familial bonds. Now more than ever, video games are advertised as entertainment that the whole family can join in on—everyone from a small child who cannot yet speak to an older adult with limited video game experience. Gaming companies who once targeted young boys now encourage all audiences to join in on the virtual adventures, and women and minorities have seen greater representation in games over the decades (this will be discussed at length later). However, video games have long eluded those who cannot or do not use their hands, as virtually all video game controllers, whether they be keyboards, cell phones or traditional controllers, require the use of hands. There are some alternatives including voice controllers, sip and puff sensors, and various methods that respond to facial movements. Nonetheless, these methods can be difficult to acquire and pose their own challenges. The wide-spread use of games only serves to further alienate people who cannot participate.

The disclosure, among other things, relates to an exploration of ways to make the common hobby of video games more accessible to those who would like to participate.

For those who do not understand the appeal of video games and why people with disabilities are willing to work against challenges to play them, this paper will briefly explain the positive psychological impacts of gaming. Video games have proven to be more useful than simple fun—games help people learn, relax, and bond with others, as well as empower and inspire. They give people great surges of joy and thrill as well as feelings of accomplishment and pride without so much as leaving their couch. This is why being left out of gaming can feel so alienating—games offer experiences that are difficult to achieve in similarly low-movement situations. Video games have fostered tight communities and been a source of strength and family to individuals feeling isolated. Games can do much more for people than entertain, especially during hard times and difficult situations. One of the reasons people can be so emotionally invested in gaming is that the core principles of a game are similar to the core requirements for people to feel the state of joyful productivity known as "flow."

Games

First this paper will describe the basic principles of games, then how these principles relate to flow. There are a few definitions of games that share key points (this refers to games in general, not just video games). Veteran game developer Katie Salen in her book Rules of Play: Game Design Fundamentals says, "A game is a system in which players engage in an artificial conflict, defined by rules, that results in a quantifiable outcome." Game designer Jane McGonigal says that there are four qualifications for a game: a goal players will work to achieve, rules providing limitations, a feedback system giving player progress, and voluntary participation. Play theorist Brian Sutton-Smith says, "at its most elementary level then we can define "game" as an exercise of voluntary control systems in which there is an opposition between forces, confined by a procedure and rules in order to produce a disequilibrial outcome."

Based on these definitions, a game must include a clear goal, rules that provide limitations, measurable feedback, and voluntary participation. The qualifications for something to be a game are similar to the qualifications for flow.

Flow

Flow is a state coined by Mihaly Csikszentmihalyi in his book *Flow: The Psychology of Optimal Experience*. He defines flow as "a state in which people are so involved in an activity that nothing else seems to matter; the experience is so enjoyable that people will continue to do it even at great cost, for the sheer sake of doing it."

There are four main qualifications for someone to enter a state of flow. The first is clear goals, or knowing exactly what is expected to be accomplished. The second is frequent feedback. This allows a person can know when they are doing well or poorly and adjust accordingly. The third is low stakes for failure. When people are too afraid to fail, they won't take risks, will be less creative, and won't learn as quickly. The fourth (and perhaps most important) is a balance between challenge and skills. People in a state of flow are challenged enough to feel productive and proud of the work they are accomplishing, but not so challenged that they experience prolonged frustration and hopelessness.

Flow is desirable in schools, jobs, and games alike. People in a state of flow are highly motivated, cooperative, productive, excited, and in an optimal state to learn and grow. Above all, flow feels good—people want to feel productive and enjoy their work. However, flow can be elusive, especially for people struggling to find a fulfilling occupation. This is the case for many people with disabilities, as the employment rate for people with disabilities is 19.3% as of 2019. This is in strong contrast to the employment rate for people without disabilities, which is 66.3% for 2019. Video games can help people experience flow when they cannot get it elsewhere, especially considering people can play video games alone with minimal financial and physical commitment.

Fiero

McGonigal explains that there is one more important emotional state that contributes to productivity and happiness in working and learning: fiero.

Fiero is an Italian word that directly translates to "pride," but its meaning is more powerful than pride. McGonigal describes fiero as "what we feel after we triumph over adversity. You know it when you feel it—and when you see it. That's because we almost all express fiero in exactly the same way: we throw our arms over our head and yell." This is the emotion people chase while working on a task, competing, or generally trying to accomplish something. Fiero can be as physically dramatic as scoring a touchdown or as simple as finally getting the cookie recipe just right. Both of these events stir up the same rush of emotion—the feeling of success. Having fiero means having succeeded.

Video games (and many tabletop games) are extremely good at providing people with fiero. This is because fiero is the direct result of succeeding at a goal, and video games are excellent at providing a multitude of reachable goals, from small "daily" goals to long-term projects that require dozens of hours. Fiero is also credited with being the emotion that "keeps people coming back for more," so to speak. The lack thereof causes people to lose interest in an activity because, naturally, no one wants to work on a task when they have no hope of success. People love fiero, but are often completely deprived of it—their goals at work or in life are so massive and long-term that they are unreachable or cannot provide the person with a sense of progress, hope, or meaning. Video games provide people with an opportunity to experience fiero without making major or impossible life changes, such as switching jobs or altering the circumstances of their life.

Games And Happiness

So it seems video games can help people feel productive, excited, and proud—but what about happy? The source of happiness is an infinitely massive topic that will not be covered here. To explore the link between games and happiness, this paper will again refer to game designer Jane McGonigal who explains what she calls the "four secrets to making our own happiness."

The first secret is daily satisfying work, which differs between people, but always means "being immersed in clearly defined, demanding activities" that allow us to see the direct impact of our effort. Games are usually fashioned such that users are immediately aware of their impact and the consequences of their actions. This is the "feedback" requirement discussed in the previous section. The second secret is the experience or ongoing hope of being successful. McGonigal explains this as us wanting "to feel powerful in our own lives" and "be optimistic about our own chances for success, to aspire to something, and to feel like we're getting better over time." Consider this in relation to the "balance between challenge and skills" requirement for flow—people experiencing such balance have constantly renewed hope in their ability to succeed and do occasionally reach success (sparking fiero). The third secret is social connections. Even the most introverted among us still wish "to share experiences and build bonds," as this is where most of our happiness comes from. Video games are not often thought of as social, but many games have thriving online communities with tight bonds. Some games require people to play with friends or strangers to accomplish tasks, and others simply simulate socialization by allowing the user to make friends with virtual characters. The fourth secret is meaning, or "the chance to be a part of something greater than ourselves." This is from the natural craving to belong and contribute to a community. As mentioned before, the world of video games is a huge, enthusiastic community composed of thousands of sub-communities playing specific games or genres. These communities are part of what can turn a one-time gamer into a life-long gamer.

TABLE 1

Summary of Games, Secrets to Happiness, Flow and Fiero Information

| Requirements to be a Game | Requirements for Flow/Fiero Loop | McGonigal's Secrets to Happiness |
|---|---|---|
| Clear goals | Clear, reachable goals | Daily satisfying work |
| Measurable feedback | Frequent feedback | Meaning |
| Rules providing limitations | A balance between challenge and skills | Experience or ongoing hope of success |
| Voluntary participation | Low stakes for failure | Social connections |

Games can increase happiness by helping us feel productive, meaningful, successful and social in our virtual worlds. Even if the productivity is artificial, it is enough to cause delight and satisfaction, especially in people who do not feel that they are otherwise participating in productive, meaningful work. People with disabilities may be particularly susceptible to these feelings, as they are at an increased risk for depression.

A 2017 study found that the prevalence of depression in adults without disabilities is between 22.8 and 27.5 percent, while the prevalence in adults with disabilities is estimated from 24.9 to a staggering 41 percent. Further, individuals with physical disabilities reported having more pain, anxiety, depression, and a lower quality of life than those without. Video games are not the answer to all of these problems, nor is any single solution. However, games could be a source of joy and empowerment for those with disabilities struggling with their mental health. In an article by The Washington Post titled, "'It's my escape.' How video games help people cope with disabilities," journalist Hawken Miller writes that, "gaming allows many [people with disabilities] to do things in a virtual space they could only dream of in reality. It also helps them connect and overcome social anxiety and feelings of depression."

Brian McDonald is far from the only gamer sharing stories about how video games have helped him cope with his disabilities. There are thousands of these stories to be found. However, if video games were accessible enough for every person with disabilities to play, this thesis would not exist. The following many pages will describe the current state of video game inclusivity, gaming technology, hands-free gaming options, controller designs, suggestions for a game controller design solution, and much more. With this brief understanding of the importance of video game accessibility, let's move into the complex and boundless world of improving it.

Inclusion In Gaming

The shift toward a more inclusive gaming world started in the 2000S, as Noah Wardrip-Fruin wrote in 2004, "computer games are themselves in a period of considerable development and redefinition . . . the channels of game interaction are multiplying, and as new artistic and marking methods arise and the first generation of computer gamers come of age, games are reaching and being developed for an ever-broadening demographic." As the decades have passed, great strides have been made toward a gaming space that is truly welcoming to all, but there is still plenty of work to be done.

Gender

Male-dominated video games are nothing new, especially for large companies such as Nintendo. Jesse Divnich, the vice president of insights and analysis for Electronic Entertainment Design and Research, said "The Nintendo Entertainment System was targeted toward boys under 10. If you look at the Super NES five years later, it starts targeting boys ages 10-15." The Nintendo Entertainment System (NES) was one of Nintendo's first gaming systems. The Super NES was released in 1990 alongside a console named the Gameboy, as if the Nintendo target audience was not clear enough. At the time, Nintendo ran TV ads targeted at young boys by featuring young boys playing games with masculine characters. As the boys who played games grew older, ads and consoles were targeted toward older boys, aiming to make them life-long players. However, girls or feminine characters rarely (if ever) made an appearance in games or advertisements.

Amanda Cote offers an explanation for how Nintendo might have contributed to how "gamers" became decidedly male-only. "A detailed content analysis of Nintendo Power issues published from 1994-1999 shows that mainstream companies largely ignored the girls' games movement, instead targeting male audiences through player representations, sexualized female characters, magazine covers featuring men, and predominantly male authors," she wrote. This lack of representation in the press ultimately affected a girl's ability to identify as a gamer, as this was never seen within the gaming community.

Whether or not someone identifies as a gamer may not seem consequential, but studies have shown that it is. Jeffrey Stone writes that the results of his 2019 research of college students "indicate that males were significantly more likely to identify as a gamer than females, thus aligning with prior research findings." Further, Stone found that people who identify as a gamer spend significantly more time playing video games than people who do not. Identifying as a gamer could be self-perpetuating in that it helps people feel and become more involved in the community, play more games, and improve their gameplay.

Men and boys also dominate gaming competitions. At a Street Fighter live-streamed gaming competition, Miranda Pakozdi (one of only two female competitors) was increasingly heckled and harassed during gameplay by competitive fighting gamer Aris Bakhtanians. Aris asked her why she wasn't wearing a skirt, offering to buy her one so he could see her in it, and urged her to take her shirt off. She was called a distraction for having "girl parts." Aris leaned up against her, smelling her and commenting on her scent. He asked her to say her bra size, and then demanded that she learn how to play the game while being continuously harassed. She ended up throwing her match and tweeting that she'd have left immediately if she were not contractually obligated to stay. Later, Aris was asked in an interview, "Can I get my Street Fighter without sexual harassment?" He responded, "You can't. You can't because they are one and the same thing. This is a community that's, you know, 15 or 20 years old, and the sexual harassment is part of a culture."

Unfortunately, Miranda's experience is not unique or near as extreme as sexual harassment can be in gaming culture. Her story and dozens of others are covered in the 2015 gender in gaming documentary GTFO: Get The Fuck Out. Todd Harper, author of *The Culture of Digital Fighting Games*, explains in the documentary that the root of the harassment problem is that, for decades, video games were a boys-only space. Men are making the games, testing the games, playing the games and selling the games. "It's a self-perpetuating cycle," he says. "Who's buying games? Straight white men in their 20S. So we're going to make a game targeted toward straight white men in their 20S. Amazingly, that means more straight white men in their 20S are going to buy your game."

To stop the harassment, the cycle needs to be broken. Today, 50% of people who play games are female, yet only 21% of game developers are women. Targeting girls and women in advertising will not be enough. In her book *Gaming Representation: Race Gender and Sexuality in Video Games*, Jennifer Malkowski explains that there is no one fix to females being "aggressively disrespected" in multiplayer gaming, but that doesn't mean there is no hope. "Obviously, creating games that feature femmes fatales will not dismantle this formidable web of gender trouble in the video game industry," Malkowski wrote, referring to the women with "smarts, sex appeal, ambition," and other admirable traits who are so often and easily portrayed in contemporary cinema. "But many who are working to alleviate these problems do advocate for increasing the number of nuanced, powerful, and playable female characters in games as one core strategy." One of the points she continues to touch on is the problem of sexualizing the few female characters that are in video games. It seems women and sex are always paired in video game contexts. In his article "Keeping Abreast Hypersexuality: A Video Game Character Content Analysis," Edward Downs conducted a character gender analysis. He found that "In comparison to male characters, females were significantly more likely to be shown partially nude, featured with an unrealistic body image, and depicted wearing sexually revealing clothing and inappropriate attire." The scope of this paper cannot cover this topic entirely but nonetheless it is interesting to note that the appearance of the female characters is contributing to the problem.

Noah Wardrip-Fruin writes about why games may not be taken as mere games. Games simulate reality, and that can perpetuate problems intentionally or unintentionally as he says that "all simulations are political." Super Smash Bros. is simulating a rough-and-tough competition. By creating a space void of female characters, the game perpetuates the idea that women are not tough enough or competitive enough to participate. Peddling this idea in an already male-dominated space does no favors for women and girls, who already face an upward battle to prove their worthiness as players.

Fortunately, things have changed in the gaming universe since the Nintendo Entertainment System was released in 1985. Nintendo released their newest console in 2016—the Nintendo Switch. Advertisements for the Switch feature boys and girls of various ages and races playing several games, making for a much broader target audience than early Nintendo ads. Super Smash Bros. Ultimate, released for the Switch in 2018 as the latest edition of the game series, also has advertisements showing significant player diversity. From the first game release in the Super Smash Bros. series in 1999 to the newest game release in 2018, there was a 22.6% decrease in playable male characters, making room for more female, non-binary and androgenous or gender non-conforming characters (See Ancillary Information A). This increase in awareness from Nintendo is echoing throughout the industry, showing promise for more gender equality in the future of gaming.

Race

Like other media industries, the video game industry has had racial representation problems since its inception. As Treandrea Russworm writes, this is both a quantitative and qualitative problem. While the number of black avatars in video games may be increasing, the narratives surrounding them are not changing quickly. Russworm explains that "the representation problem has less to do with the pitiably limited number of characters of color who appear as playable protagonists in games and more to do with the ideological work those characters facilitate, including how gamers feel about and express empathy for such characters when they do happen to appear in games across genres." This is seen clearly in games about sports. These games appear diverse because they often feature a high percentage of black people, most of which are modeled after real-life professional athletes, such as LeBron James and Michael Jordan. David Leonard, Professor of Comparative Ethnic Studies at Washington State University, explains that "eight out of ten black male video game characters are sports competitors," suggesting that the number of black video game characters is not a meaningful way to track racial representation in video games overall. The quality and nature of the representation are highly consequential to the audience's perception.

If the representation promotes harmful stereotypes or confines avatars of color to specific characteristics and environments, then the representation only impairs the progress toward a more inclusive gaming community. This was a major problem in the early 2000s and earlier, before gaming companies started expanding their target audiences. A 2002 study concluded that "African-American characters are more likely to display aggressive behaviors in sports games (i.e., trash-talking and pushing) than whites. More than 90% of African-American women function as props, bystanders, or victims." Leonard points out how the 1999 boxing game Ready to Rumble includes characters of a variety of races, but only in poor, stereotypical depictions. He writes that the characters include, "Afro Thunder, a gigantic Afro-wearing boxer, who is more adept at talking trash than fighting . . . a Hawaiian sumo wrestler who speaks poor English and has slanty eyes, a heavy accented Croatian immigrant, and a Mexican boxer named Angel (raging) Rivera."

While there are still stereotypes plaguing minorities in video games, some progress has been made over the past decade. Apex Legends, a game with over 70 million registered users as of October 2019, features mixed race, black, Asian, gay and non-binary characters with only three white characters. There are two black female characters celebrated for their combat and medic skills, ambitious attitudes, and nuanced personalities. Fortnite, a third-person shooter game with over 350 million players worldwide, randomly assigns skins (or the appearance of the avatar) to the player with each match unless the player pays for a specific avatar. These random skins include black, Hispanic, and mixed-race characters, all of which are equal in skill and utility during play. Another way some games have addressed racial representation is by allowing more avatar customization. Players can pick from a number of skin tones, hairstyles, and facial features to create a unique character. This is seen in casual games Stardew Valley and Animal Crossing: New Horizons as well as the popular first-person adventure Skyrim and the latest installment to the Pokémon franchise, Pokémon Sword and Shield. These are just a few of the many games that allow avatar customizations.

Fixing racial representation in video games will have to start outside the games—in the communities that the players live in. Protests across the United States in the summer of 2020 inspired many game companies, including Electronic Arts, Epic Games and Sony Interactive Entertainment/PlayStation, to declare their support for people of color and make donations to social justice organizations. These actions are helpful but will not be enough to fix the racial representation problems facing video games today. The International Game Developers Association found in a 2019 survey that, among game developers worldwide, 81% identify as white/Caucasian/European, 7% identify as Hispanic/Latinx, and only 2% identify as Black/African-American/African/Afro-Caribbean. Better representation in games will require better representation in game companies as well. As video game companies become more focused on creating inclusive spaces, we will expect—and demand—to see better racial representation in the years to come.

Physical Accessibility

Gamers have been witnessing the slow but determined march toward gender, racial, and sexuality inclusivity for years. These strides have changed the industry by impacting both the characters in the games and the people working behind the scenes. Nowadays, games are advertised for "everyone"—all ages, all genders, and all cultures worldwide. But in this "games for everyone" frenzy, gamers with disabilities have been evermore isolated and excluded. Perhaps this was less apparent when video games were only intended for white boys under 12 years old, but now the involvement of so many people in games just brings more attention to how gamers with disabilities struggle to be a part of the community the way others can. There are over 33 million gamers with disabilities in the United States alone. While people with disabilities are also seriously underrepresented in video games, it is difficult to start discussing this when so many people with disabilities physically cannot play the games to begin with. In *Mismatch: How Inclusion Shapes Design*, author Kat Holmes talks to John Porter, a gamer with motion disabilities, about inclusion in video games. The following is Porter talking about his experience playing video games with limited physical mobility:

"All of these games are based on the broad assumption that you'll be using your fingers and your hands to interact. And for me, that is almost entirely moot . . . Whenever I'm using technology, I use speech to control it even though it was never designed to work for speech. It's not just that a game isn't optimized for my abilities. It was made without ever even considering the possibility that someone would need to interact with it in the ways that I do. That places the onus on me to figure out all these workarounds. For gamers with disabilities, we have to spend as much time figuring out how to play a game as we do actually playing it."

This is part of the inspiration for this project—suggesting a design concept that helps players with disabilities spend less time trying to figure out workarounds and more time enjoying their game. One way to see some of the ideas and home-made inventions is to scroll through posts on the r/disabledgamers page of Reddit. If you do this, the first thing you may notice is that the large number of posts asking for help or advice from people trying to find hands-free gaming options. Scrolling through this subreddit as this was written, there were posts titled, "Hands-Free Hollow Knight," "Hand-amputees, what is your solution to using VR controllers," "PS4 with tremors," and a man describing that his wife has no function in her right hand due to a stroke and is looking for alternative controllers. Each person describes their own reason for wanting a hands-free device, but their problems are the same—the available controllers and hands-free gaming options just aren't adaptable enough for them. Modern controllers are too complex to find easy adaptations, and every gamer must research unique solutions to each gaming system and game.

Video games have also become more complex in design over time. Early games, such as Pong and PacMan, relied on very few controls as they were based mainly on using one four-direction stick. This is relatively accessible compared to video game controllers produced today, such as the Nintendo Switch Pro controller or Xbox One Controller. These products have over a dozen buttons and two analog sticks, largely requiring two dexterous hands to operate. While someone with a motion disability may still find Pong perfectly easy to play using one large stick, the same person could have difficulty using modern controllers to play more complex games.

Some companies have taken steps to increase accessibility by making less complex versions of their current controllers, although this does not benefit people who cannot use their hands. Microsoft launched the Xbox adaptive controller in 2018, a device that allows full customization of its buttons, including sensitivity controls. A commercial for the controller aired during Super Bowl LIII featuring disabled children playing video games using the device. Microsoft received praise from thousands of people, including celebrities, across social media platforms, but not everyone was so impressed. Josh Straub, creator of the physical accessibility review website Dagers, told The Washington Post, "In the area of hardware, the [Xbox adaptive controller] is a great device, but it only helps one segment of the disabled gamer population. And yet the narrative seems to be that now everyone can play, because Microsoft released this device."

This narrative—that one device or one change can make gaming accessible for everyone—is part of the struggles facing gamers with disabilities. It is important to understand that there is no single way to make games, or anything else, 100% accessible. The path to more accessibility will be long, slow, expensive, and never enough to please everyone. This is not to be pessimistic but to ground expectations in reality.

Holmes tells a story about the United States Air Force (USFA) that illuminates the trouble with trying to create one solution that works for everyone.

In the 1940s, the first fighter jets were designed to fit the average pilot. The USFA measured hundreds of bodily dimensions across thousands of pilots and used the averages of that data to design the instruments of the flight deck, or cockpit.

Every feature of that flight deck was fixed in place, without adjustability. The assumption was that any individual pilot could just adjust himself to overcome the gap in reaching any element of the flight deck that wasn't a perfect fit for him.

However, the Air Force was experiencing a high rate of crashes that couldn't be attributed to mechanical failure or pilot error. A Lieutenant and researcher, Gilbert Daniels, studied just ten of those human dimensions that were used in the design of the original flight deck. He measured four thousand pilots to confirm how many of them fit all ten dimensions.

The answer was zero. Not a single pilot matched all ten dimensions.

This eventually led to new adaptable designs that each pilot could adjust to fit their own body, including seat belts, seat heights, and the position of controls. These changes led to improvements in both performance and safety.

A similar approach needs to be taken with video games. To make the flight deck safer and easier to use, many adjustments had to be made and parts changed to become adaptable. As a result, flying is now a better experience for all pilots. With the right changes, video games can become better for everyone. But we will have to make changes to more than just controllers—we may need to see changes throughout the entire game design process.

SUMMARY

As gaming becomes more popular and more relevant to a person's social and cultural involvement, the pressure to makes games more accessible is growing faster than the software necessary to increase accessibility. Hands-free gaming accessibility, an area lacking attention thanks to the common use of traditional hand controllers, could be the most easily achieved by creating universality in the way people talk about and design game controls. This writing creates a framework on how to design such a game control experience.

Video games were initially very exclusionary, designed for young white boys from upper-middle-class families. Over time, game developers have made more and more efforts to include women and minorities into games and gaming communities. However, there is still a long way to go. This great inclusivity wave for video games has made gamers with disabilities ever more excluded. This is especially true for gamers who cannot use their hands to play.

Virtual reality is both especially exclusive toward people with disabilities (as people must be one with the virtual body) and potentially the answer to hands-free gaming. By advertising and design, current virtual reality headsets, interface designs and games highly favor abled people. However, VR allows people to communicate with the machine using head movements, and many headsets are already equipped with other useful sensors such as eye-trackers and microphones. These sensors suggest that virtual reality headsets have great potential for hands-free gaming.

Many different gestures could replace hand gestures for gaming purposes. Breaking down games by primary, secondary, tertiary and quaternary actions according to how frequently they are used helps people determine which gestures may be better for which buttons on any particular game. This is because each person is an individual and will have their own unique range of comfortable abilities, and each game will have a unique set of buttons that are used more frequently than others.

Likewise, a person must become familiar with what gestures work best for their gaming purposes. It would be useful to have a game to help determine this. Such is the foundation of the technical project—a diagnostic game that could use face-tracking, speech, eye-tracking, etc. to measure the dexterity of a person's facial gestures and recommend which of their gestures would be best for primary, secondary, etc. The technical project is a part of a larger interface software concept envisioned by the inventor. This software would harness data from game designers, hardware, and gamers to produce individually-optimized control suggestions for each game for a particular gamer.

The future of gaming accessibility will be shaped by today's young designers, engineers and gamers. Current solutions lack in adaptability and versatility. The project contributes directly to the gaming industry by challenging game control normativity, refocusing game controls on universal design, and encouraging game design that has the success and enjoyment of the individual user at heart, no matter their abilities.

Games will never become as accessible as they could be without a partnership between game designers, hardware designers, and gamers with disabilities. Much of the technology to create great adaptive gaming already exists; we just haven't brought all the required resources together to make great accessible software. Hands-free gaming will only become more important as time goes on because as this gaming generation ages, more people will become disabled and require new equipment to game. Technology such as

BRIEF DESCRIPTION OF THE DRAWINGS

FIG. 31 shows a flowchart relevant to reducing to relevant controls from FIG. 30.
FIG. 32 shows a flowchart relevant to aligning multi-dimensional controls from FIG. 30.

DETAILED DESCRIPTION

Virtual Reality and Accessibility

Figure 1:
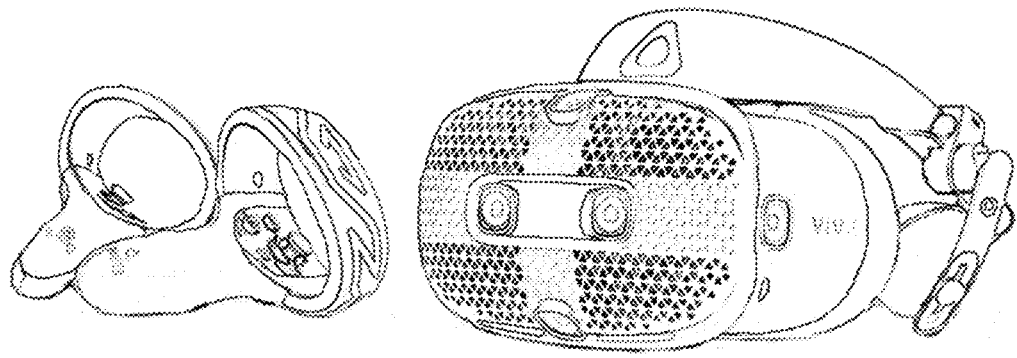
FIG. 1 shows a Vive Cosmos VR headset and controllers.

One of the great affordances of virtual reality technology is that the headsets' motion sensors allow the user to communicate with the machine without using their hands. Yet even the newest virtual reality games and headsets heavily rely on hand controllers for navigation and gameplay. The image of FIG. 1 (from the company website) is of the 2020 Vive Cosmos, a cutting-edge piece of VR technology equipped with "six camera sensors and the latest software optimizations to enhance inside-out tracking accuracy," yet it still requires the use of two hand controllers. Virtual reality headset advertising even targets people without disabilities by running ads of people leaping through virtual battlefields and ducking to doge enemy projectiles. Controlling the virtual body using intuitive physical movements is a noteworthy technical feat—but not for those who relied on a lack of physical movement for comfortable gaming. In this way, virtual reality presents a tense dichotomy between becoming a highly-accessible technology for hands-free gaming, and the most alienating yet.

VR technology is improving rapidly, and as more sensors are added to the systems and current sensors improve, new possibilities for hands-free gaming arise. These additions and improvements will not only make gaming more accessible, but a more comfortable and enjoyable experience for everyone. Jeremy Bailenson, founding director of Stanford University's Virtual Human Interaction Lab, wrote, "VR will not only give us access to experiences that are difficult to obtain, it will also allow us to see impossible things, fantastic things, things that will allow us to see the real world in new ways and allow us to stretch out minds beyond anything we can imagine."

Virtual reality headsets are equipped with a multitude of sensors, including cameras, microphones, gyroscopes, accelerometers, magnetometers, eye-trackers, structured light systems and more. Yet virtual reality games heavily rely on hand controllers for navigation and gameplay, stripping the technology of its natural potential for hands-free use. Part of the reason hand controllers are required for these games is that the gameplay requires the user to use virtual hands to accomplish tasks. These high-movement games are heavily advertised for their flashy action-packed scenes, further solidifying the ty between virtual reality and inaccessibility.

Figure 2:
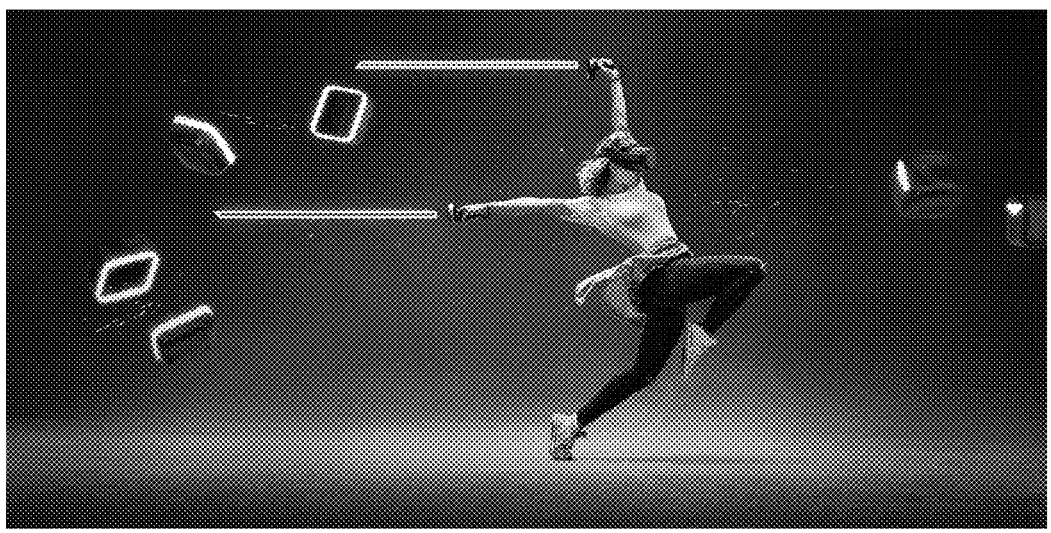
FIG. 2 shows an Oculus Quest VR ad for Beat Saber.

Virtual reality headset advertising targets people without disabilities by running ads that emphasize full-body movement in dramatic environments. One popular game called Beat Saber appears in numerous VR commercials, showing players ducking, jumping, and swinging their arms across space as they slice open colorful cubes, for example shown in FIG. 2. Other commercials depict people playing virtual sports such as tennis and bowling, or involved in dramatic fight scenes as they dodge bullets and attack enemies.

There's nothing wrong with showing off what the VR system can do using these action-packed commercials. In fact, these companies would not exist if successful marketing campaigns such as these had not convinced thousands of people to buy VR systems in the first place. However, this advertising technique is inherently excluding people with motion disabilities. VR systems also offer games that do not require much movement, such as games where you explore a national park or museum. The Oculus Quest offers a "seated" mode to most games where users can relax in a chair while playing. These games do still require some hand movement as the user is expected to use the controllers to navigate and play, but these "seated" experiences rarely appear in the media. As a result, VR is portrayed as an experience made for people who can jump and wave around their arms as they fight virtual zombies and play virtual sports.

The Virtual Body

Before virtual reality, people controlled characters in video games using their fingers on sticks or controllers. In this way, controlling the virtual bodies was not intuitive—the body may jump with a press of one button and swing a sword at the press of another, which is entirely unlike jumping or swinging a sword in real life. In a sense, this evens the playing field for everyone who can use the required controller—the virtual body will jump the same height and swing the sword at the same speed regardless of the strength of the player. The virtual body knows no pain, experiences no fatigue, and fears no permanent death. It is, in a sense, perfect. All players who can use an appropriate controller can experience this subtle yet empowering perfection.

Virtual reality has no such even playing field as it demands the player to be the virtual body. Anybody who has played both 2D and VR first-person shooters knows the startling difference between the two. In 2D, a player merely swivels their thumbs and twitches their fingers to aim and shoot a hoard of attacking zombies. In VR, a player must raise their arms to aim the virtual gun. They must turn their physical body around to survey the area. They must experience the thrill of a zombie running toward them as it roars and swipes its claws through the air. They must push and punch the zombie away from their physical body to protect their virtual avatar. It can actually be quite scary for people who have never played this kind of VR game before! Bailenson wrote in his book *Experience on Demand*, "having watched thousands of people in my lab, many of them repeatedly experiencing VR, I can tell you that VR experiencers behave differently. It takes a lot of viewings and a lot of willpower not to flinch when the crates start falling in the earthquake simulator." The environment can be so immersive that the user nearly forgets that they are only a headset away from escaping danger. They may scream in playful terror, punch and shoot and jump in a desperate effort to fight off their attackers, all the while flailing around their physical body. It is quite the spectacle. In this way, VR is a gaming experience unlike anything a 2D game could deliver.

Virtual reality with its life-like mapping to the virtual body is, therefore, a much more intuitive design. What could be a more obvious way to throw a virtual punch than to throw a physical punch? This is some of the delight of VR—the satisfaction of completing virtual actions using full-body movements in the physical world. People who were never terribly impressed by 2D gaming could be drawn into the immersive, intuitive motions of VR design.

This new approach to controlling the virtual body comes at the greatest cost to accessibility yet, and the most uneven playing field known to modern gaming. The virtual reality body is the same regardless of who wears the headset in that it occupies space in the same way. But real bodies do not all occupy space in the same way. Real bodies have an infinite number of differences, all of which need to be mapped into the same virtual body. This is, of course, a problem for those with motion disabilities, as there are assumptions about how the virtual body moves are how the player completes those movements.

Virtual reality technology is still in its infancy and will likely become more adaptable, versatile, and accessible over the coming decade. However, there is no need to wait for the technology that could make virtual reality experiences hands-free—it already exists.

Virtual reality headsets are already equipped with the technology to be hands-free devices; they only lack the interface design necessary to be used without hand controllers (an example of a hands-free VR interface will be discussed shortly). Gyroscopes in the headset help it detect motion and microphones listen to the user's voice. These sensors are already enough for a hands-free gaming experience, but some headsets include even more advanced technology. The HTC Vive Pro Eye has the Tobii eye-tracking system built in for optimized VR experiences. The 2021 HP Omnicept Edition VR headset will have face-tracking, eye-tracking, and a heart rate monitor. These extra sensors are intended to determine when the user is overwhelmed, but they can be used for other purposes as well.

This is why VR is quite promising technology for the future of hands-free gaming. This is also why this document focuses mostly on head gestures over gestures or movements from other parts of the body. This paper was written with the future of gaming in mind, considering the current state of gaming technology.

Virtual reality headsets are already helping people access hands-free experiences, even if indirectly. Arca's Path VR is a hands-free virtual reality game in which the user guides a ball through a puzzle maze using head motions. The game offers 25 levels of challenging physics-based gameplay, beautiful crystalline landscapes, and an ambient soundtrack of chilled experimental electro music.

Figure 3:
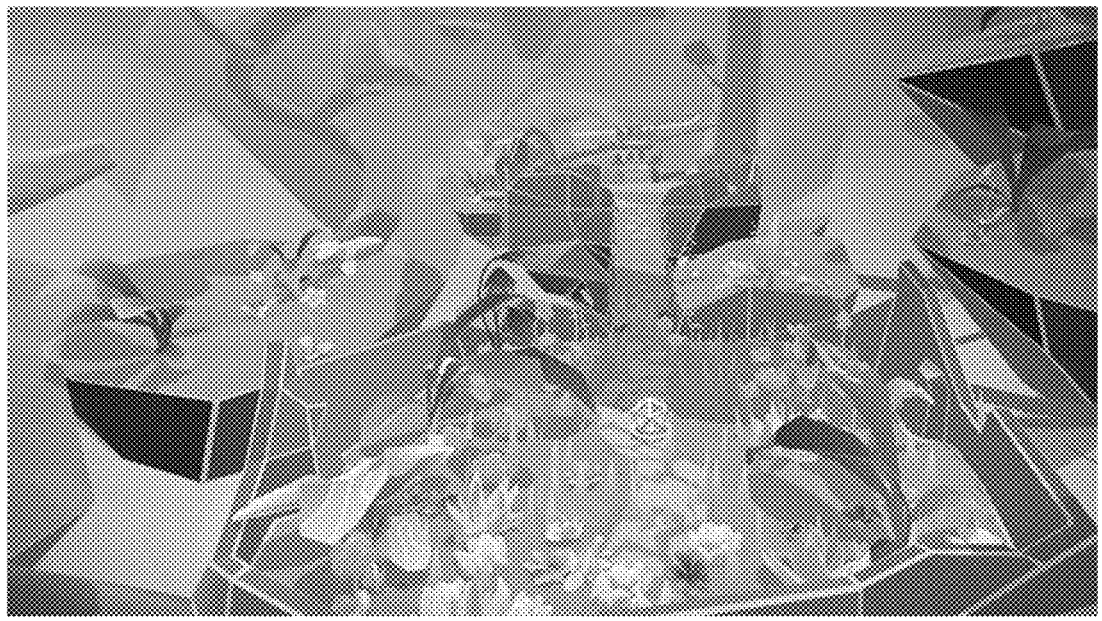
FIG. 3 shows an Arca's Path VR screenshot form its Steam profile page.

Arca's Path VR provides a delightfully immersive and engaging hands-free experience that does not feel lacking or limiting without hand controls. While not as complex as some virtual reality adventure experiences, this game still provides a captivating and aesthetically-pleasing escape with more interaction than other popular hands-free experiences, such as watching a movie. Arca's Path VR, shown by example in FIG. 3, is a good reminder that the goal of a hands-free gaming experience should not necessarily be to produce a highly complex yet still accessible game, but a game that balances optimal user experience with challenge.

The Eyeflite Ava is a hands-free virtual reality software that can be accessed through the Oculus Go headset. The software provides the user with wireless private computer access that allows web browsing, a text editor, and text messaging. Navigation only requires head movements (or "head gaze controls"), and the user may choose to use voice dictation for typing. There are even a few head motion mini-games and relaxing environments to explore.

Figure 4:
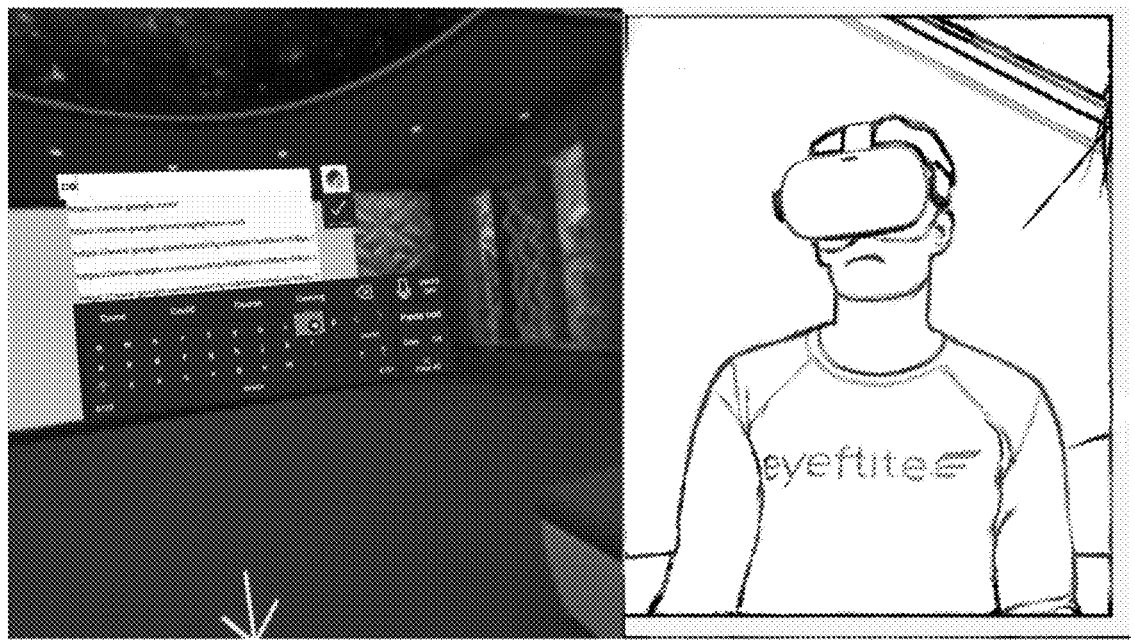
FIG. 4 shows Eyeflite Ava, screenshot taken from the "Intro to Ava" YouTube video.

This software is inspiring for hands-free interface design because it demonstrates how head motion navigation is achievable with current virtual reality technology. The interface relies on using "dwell," or staying still, to make selections and head movements to move a cursor over the interface. Eyeflite Ava, illustrated in FIG. 4, is especially interesting for the sake of this paper because it is specifically designed for people with motion disabilities. The headset has features meant to best serve people with disabilities, such as notifying a caretaker when the user wants the headset removed.

Unlike other gaming technology, virtual reality headsets sit on the user's face. Headsets weigh about one pound or more and press firmly on the forehead, nose and cheeks. It is not difficult to imagine how this may become uncomfortable over time—most people are not used to wearing heavy objects on their face. Further, the discomfort from the device itself is by far the least of VR comfort issues.

The biggest problem facing VR comfort is motion sickness. This is especially true in games where the player "travels" farther in the virtual world than they do in the physical world. Some games remedy this problem by not showing the player in transit and skipping immediately to the destination after a "blink" of darkness, but this does not work for everyone. Players also complain of eye strain, headaches, fatigue, acne (from poor headset hygiene), disorientation, injuries and even seizures.

There is no one easy fix to making virtual reality more comfortable for users. This is partially because there are so many factors leading to the above problems. The single biggest problem is latency, which "in most VR systems causes more error than all other errors combined." Latency means there is a delay between the user's action and the machine's reaction. This is a huge contributing factor to motion sickness. Others are a lack of precise calibration, low accuracy in head-trackers, low refresh rate, and low tracking precision leading to jitter or shaking. Other problems include an offset center of mass which can tire the neck, an improperly fitting headset that could lead to headaches and excessive pressure on the face, and misaligned distances between lenses and other imaging parts that lead to visual discomfort symptoms.

One problem with VR headsets is that they prevent your eyes from focusing on objects naturally, leading to eyestrain. In everyday life, eyes perform two tasks to focus—converge and accommodation. Converging means that the eyes move together to focus on objects. The eyes point straight when looking at far away objects and slowly tilt inward to be more "cross-eyed" as they focus on closer objects. Meanwhile, accommodation happens individually, meaning each eye changes its shape to focus appropriately. When performed correctly, this means that only what the eyes are looking at will appear sharp and clear to the person. Objects in front or behind will blur. In VR, converging occurs normally as the eyes look into the headset lenses, but accommodation is stunted. The focus of the lens is predetermined by the creator of the headset, and therefore no amount of accommodation will affect the clarity of the scene. Eyes may work exceptionally hard to accommodate to no avail, leading to fatigue.

The problem here is that the VR headset has no sensor to determine what the user is focusing on, so it cannot adjust the scene's sharpness accordingly. While depth perception sensors exist, you are unlikely to find out outside of an ophthalmologist's office. But imagine for a moment if VR headsets included these sensors—how so much more space is opened up for user interaction. Imagine accessing menus simply by focusing on them, or jumping in and out of applications by focusing on their icons. Even in crowded environments, the user could navigate between actions simply by looking at where they are in space. This would be a massive leap for hands-free design, as it could be paired with eye-tracking software for faster and precise navigation, typing, gameplay, etc. Changing focus could be a hands-free way for a user to select a button or back out of a menu.

Adding a depth-perception sensor would not only make VR more accessible, but a more comfortable experience for all players. The same could be said with improving some of the existing sensors. More adjustable and lower-weight headsets would make VR more accessible to people with head and neck pains as well as people whose faces or skulls do not conform to average dimensions. Higher precision and accuracy in head-trackers will improve hands-free navigation as well as reduce motion sickness. Face-tracking could be used to adjust settings based on sensing user discomfort as well as be used to control the interface. Focusing on creating a better hands-free experience will consequently optimize the experience for all players.

Controllers

This paper includes an exploration of a hands-free game design. Until this point, it mostly explains background information that led to this concept and the driving forces behind my design and discussion decisions. Games are a massive part of modern culture, capable of bringing feelings of joy, accomplishment, and empowerment, which is why the inventor believes that games are more than activities for children and should be taken seriously in terms of inclusivity. Modern video games are seemingly designed for "anyone" to play, but this is not the case as they require the use of two hands. This is why the included ideas tend toward a hands-free design—it is not just for people with motion disabilities, but for people in all kinds of situations where they cannot use their hands. Virtual reality technology is already equipped with all the sensors necessary (but not necessarily desirable) to make gaming hands free, which is why the inventor decided to write about a head-gesture-centric design. Without minimizing the benefits of improved and new hardware, a head-gesture-centric design can be produced, at least in MVP form, simply by writing software for existing VR hardware platforms.

This next section of the paper describes several hands-free gaming concepts. The concepts comprise a multi-step streamlined experience for hands-free gaming that starts with the game designer and moves to the gamer. The paper proposes a method of categorizing game controls by frequency of use that could make controllers more accessible and easier to remap. But first, this paper will cover background information on possible hands-free gaming gestures and alternatives.

Head Motions and Gestures

There are numerous motions and gestures used to operate computers and replace hand controls in video games. A few major categories are covered below.

Degrees Of Freedom

The six degrees of freedom (6DOF) refer to the possible movement of an object in three-dimensional space. Imagine an object floating freely in space—it may change position by moving up/down (heave), left/right (sway), or forward/backward (surge). It may also rotate in space on the normal axis (yaw), transverse axis (pitch), and longitudinal axis (roll).

Figure 5:
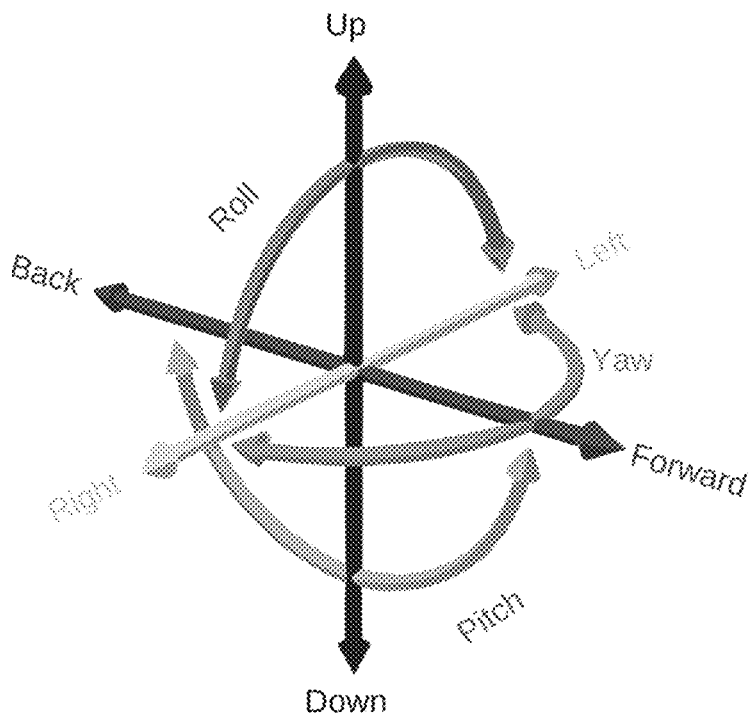
FIG. 5 shows the six degrees of freedom.

The three degrees of freedom (3DOF) commonly referred to in the context of virtual reality are the rotational motions pitch, yaw, and roll. The 3DOF are the ways in which a person's head can move without moving other parts of the body, making the 3DOF especially relevant to hands-free virtual reality gaming. The easiest way to imagine these motions is roll as a nod, yaw as shaking the head "no," and pitch as a confused head tilt. These are the major head gestures that assist in navigating virtual reality interfaces without using the hand controllers. FIG. 5 is a helpful example taken from Wikipedia.

Eye-Tracking

Figure 6:
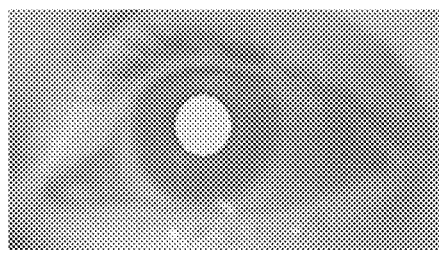
FIG. 6 shows a pupil glowing in near-infrared/infrared light.

Eye-tracking technology uses cameras pointing at a person's eyes to determine where they are looking. Currently, the most accurate trackers use four cameras, with two pointed at each eye, but some eye-tracking can be accomplished with a single camera and a few minutes of calibration. Currently, state of the art eye-tracking technology uses four infrared cameras and shines near infrared light into the eyes for high-precision tracking. Infrared cameras are better because a person's pupil glows in infrared light, making it very easy for the computer to track its movements. This is demonstrated in FIG. 6, taken from Wikipedia.

Eye-tracking has long been used as a possible hands-free alternative for controlling computers. The mouse is moved with the eyes and clicking is accomplished through other gestures, such as speech recognition, dwelling on a selection, or blinking. Some companies, such as Tobii Dynavox, have created software that considers a 3D model of the eye. The 3D perspective increases the quality of the user experience by allowing the user to move their head freely without disrupting the accuracy of the eye-tracking.

Eye-tracking has proven to be a powerful tool for those with motion disabilities, but has limitations for its use in the gaming universe. The most glaring problem is that people do not necessarily want to look at something to select it. Eyes move more than three times per second on average. People constantly use their eyes to explore their surroundings, and this is no different in gameplay. Pacman players may wish to look around the screen without Pacman following their eye movements. Pong players may want to look across the screen without their eye movements controlling the placement of the paddle. For this reason alone, eye-tracking can only be useful in certain gaming contexts, and likely will need to be accompanied by an "on" and "off" switch.

Other limitations of eye-tracking include problems with precision, especially in 3D spaces. In a 3D space, only technologies created to track depth perception can determine what exactly a person is looking at. Eye-tracking technology is also less accessible because high-quality glasses are expensive. There is a wide range of prices, but most are over $1,000 and some over $10,000. Free software that uses the computer's built-in webcam is extremely limited in accuracy and use cases. Users who are serious about using eye-tracking as a means of controlling a computer mouse are best off finding at least two cameras and subscription software for eye-mouse control.

Face Tracking

Face-tracking is another technology for controlling a computer mouse or other controller. Face-tracking software works by using databases of face images and geometric algorithms to determine the movements of facial features. These software packages are surprisingly comprehensive, tracking eyes, eyebrows, cheeks, and lips, and understand facial expressions such as frowning or sneering. Face-tracking has become widely popular for entertainment purposes—Snapchat and Instagram use this capability to apply amusing filters to people's pictures and videos, such as cat ears, glasses, and facial hair. Apple uses face-tracking for everything from creating emojis that match one's expression to using Face ID to unlock one's iPhone.

Face-tracking controllers work in a variety of ways. Some, such as Kinesic Mouse, are completely customizable—a user can select which facial movements or expressions should be mapped to which controls. Others are more simple, such as Smyle Mouse. The user moves the mouse through head movements (the mouse seems to follow where the user's nose is pointing) and the user smiles to click. Customizable options are more realistic for complex gameplay, but simple options may be better for basic computer use and perhaps casual PC games.

Limitations to face-tracking are similar to that of eye-tracking in that face-tracking software can be imperfect, expensive, and unrealistic depending on the situation. While not as expensive as eye-tracking glasses, face-tracking software is usually several hundred dollars (as of 2020) and is often a subscription service, so this cost is annual. Face-tracking relies on the user's ability to have great control over their facial movements and focus on their expressions. If facial movements are tracked from gameplay control, then involuntary smiles, gasps, sneezes, etc. could disrupt play. Games where a player must press multiple buttons at once or in rapid succession would also be difficult to play using face-tracking (and perhaps impossible to play with eye-tracking). These are just a few of the problems with face-tracking technology as a gaming controller—many more lie in the nuances of facial muscle fatigue, precision, etc.

Speech Recognition

Speech recognition has been a huge asset for hundreds of uses over the decades, and voice recognition technology has advanced dramatically since its inception. Speech recognition software and apps are plentiful, and many are specialized to help users with specific tasks, such as writing papers or translating to different languages. Artificially intelligent personal assistants are built into smartphones so users can search Google, send texts, and make calls while driving or doing other tasks that prevent typing.

Figure 7:
FIG. 7 shows part one of a MouseGrid demonstration.
Figure 8:
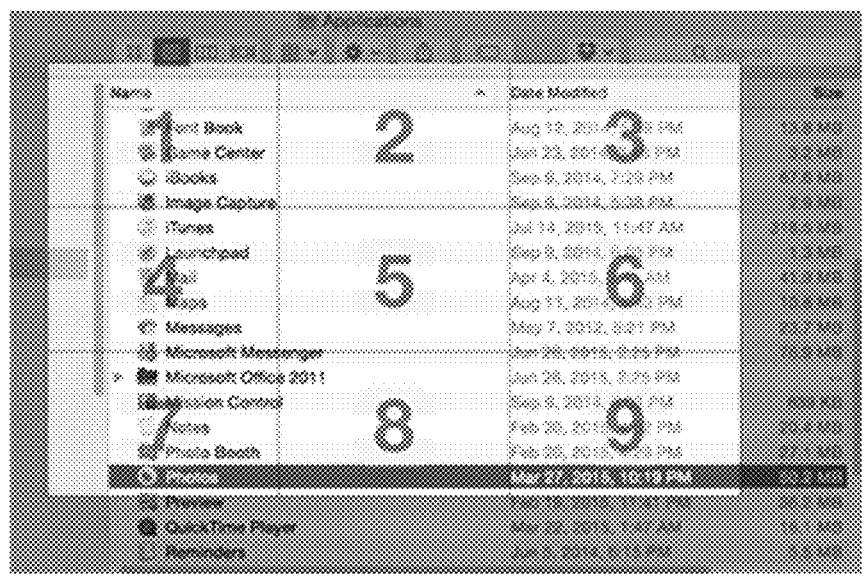
FIG. 8 shows part two of a MouseGrid demonstration.

There are several dozen programs that help users speak to control games in a variety of unique ways. MouseGrid divides the user's screen into nine numbered sections and the user says the section they want to select. Then that section is cut into nine sections and the process repeats. This is demonstrated in FIGS. 7 and 8, taken from Nuance.com. Some programs, such as Voice Finger, respond to literal key commands so the user can use the keyboard with their voice. Windows Speech Recognition Macros allows the user to create custom commands, including sequences of actions. These are just a few of the many available options.

Speech recognition technology can also be trained to respond exceptionally well to a specific user. For example, Apple's built-in iPhone assistant Siri can be trained by the user to only respond to their voice. To "wake" Siri, a user may say, "Hey Siri." This feature was abused (although often innocently) by people who wanted to control their friends' phones. They might have said, "Hey Siri, text mom . . . " to send a text on someone else's phone without their consent and without having to unlock their phone. Burger King created a commercial that abused this feature on Google's devices, which respond to the phrase, "Okay Google." Burger King ran ads that asked, "Okay Google. What is the Whopper sandwich?" and let the users' devices do the rest, responding with, "The Whopper is a hamburger, consisting of a flame-grilled 4-ounce beef patty, sesame seed bun, mayonnaise, lettuce, tomato, pickles, ketchup and sliced onion."

Speech recognition's most glaring limitation is its terrible inefficiency. Understanding speech is slow—a computer must parse words, interpret them, and then execute a command each time. When the wrong command is executed, the action takes more time to correct. Speech impediments, accents, and proper nouns all pose problems. Distinguishing between similar-sounding words is also still difficult for programs (think about "clothes," "close," and "closed"). The often-used grid of nine sections is an extremely slow way to click around a screen compared to common mouse control. All this considered, speech recognition software is at least quite accessible. It is available on all operating systems for free or low prices (under $15 in most cases, as of 2020).

Sip and Puff Devices, Lip and Tongue Movement

Figure 9:
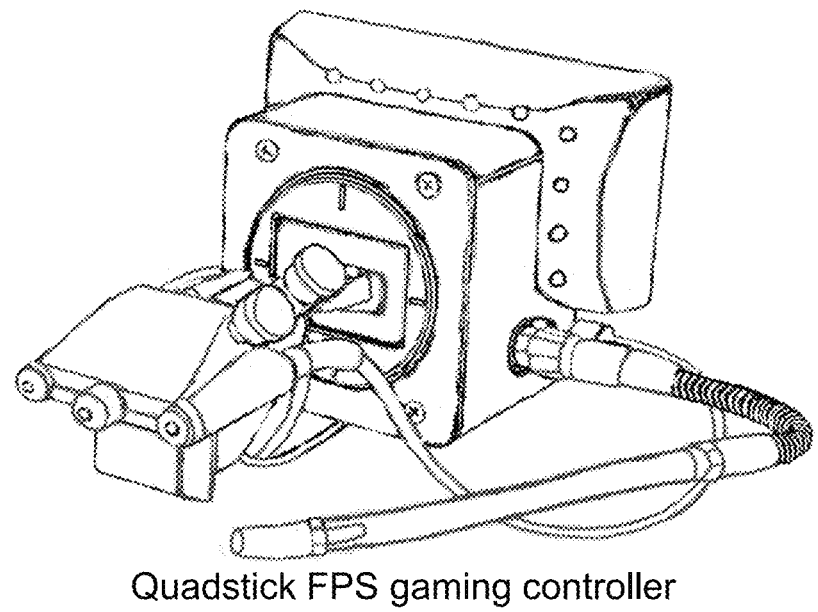
FIG. 9 shows Quadstick FPS gaming controller.

There are a variety of lip and mouth control devices available for some level of computer or game control. The QuadStick uses four sip/puff pressure sensors and a lip movement sensor, which can be assigned to any game controller. This technology is specifically made for people with quadriplegia, but the sip/puff system easily extends to people with a variety of disabilities. Similar technologies are used to help people control wheelchairs and motorized scooters. The Quadstick comes in three different versions, meant to make the device more accessible to people with different abilities or lower budgets. FIG. 9 shows a Quadstick FPS game controller, taken from the company website.

Some wheelchairs and other devices can be controlled by tongue movement, which has proved highly successful for those with spinal injuries or other conditions that cause wide-spread paralysis. In some iterations, the user wears a small tongue piercing that communicates with a headset. In others, the user wears a retainer that holds a sensor to the roof of their mouth. This sensor can detect tongue location and pressure to control a machine.

Very few companies have picked up sip/puff, lip or tongue movement systems for game control, making options limited for those who would like to try this method. Even the cheapest Quadstick is over $400. Customers must pay $55-$90 in shipping and may also need to purchase expensive converters, bringing the total to over $700. This technology may become cheaper in the future as new models are created and older versions become discounted. For now, players on a tight budget may need to opt for cheaper alternatives.

Breaking Down Game Actions By Frequency Of Use

Ideally, the ergonomics of any gaming controller are good enough to allow the player to enjoy a few hours of gaming without any discomfort. Players who found a controller uncomfortable or painful wouldn't be likely to play for long, whether it is a hand controller or hands-free system. When considering a hands-free gaming experience, the first priority is comfort.

This exposition does not determine who exactly would use a hands-free option from an abilities perspective. There is such a range of abilities and health conditions, much of which fluctuate in effects on a daily basis, that creating any one controller map would be minimally useful. Rather, the most useful controller would be the most flexible. It should be able to adapt to a variety of inputs, and ideally, players should be able to create and save their own maps for specific games. Multiple maps per game would be preferable because the same person may experience oscillating comforts and abilities on a day-to-day or even hourly basis.

It is necessary to implement different controller maps for different games because of the aforementioned priority of comfort—different games will require heavier use of certain buttons or inputs. While this may not be a big deal for fully able players using common hand controllers, it could present problems for players with motion disabilities using specialized controllers.

For example, consider if the same hand controller is used to play the classic games PacMan and Pong. Let's say PacMan was mapped to the controller as so: the stick is used to navigate, and the A button is used to select options on the game menu. Let's say Pong was mapped to the controller like this: the directional pad is used to navigate, and the X button is used to select options from the game menu. Both of these games have two fundamental actions: navigate and select. But if the hand controller was strictly and inflexibly mapped to, let's say, a face-tracking controller, then the player would need to be able to comfortably complete four different actions (two kinds of navigation actions and two kinds of selection actions) as opposed to two. If the player could map the hand controller to the face-tracking controller however they would like for each game, the player could make both kinds of navigation the same facial gesture according to what is the most comfortable for them. This is especially important for people who have a limited amount of gestures they can comfortably complete in repetitions.

The problem is exaggerated with games that use many different buttons in various combinations, which is the most common scenario with modern games. Further, the same game may appear on numerous consoles and present slightly different controls on each one (these differences are the most apparent between the same game on a PC and a console).

To help mitigate the confusion around game controls and buttons, the inventor proposes an embodiment where each game be broken down by the game designers into primary, secondary, tertiary, and quaternary actions based on the frequency of the action. The more frequently an action is used, the more important that it be a highly-accessible and comfortable gesture for the player. Not every game will have the same kinds of actions used at the same frequencies, which is why each designer must assess each game independently.

The inventor encourages the designer, in an embodiment, to make these decisions upfront because, in this embodiment, it is the designers' job to shape video game accessibility, not the players. It is already increasingly popular for modern game companies to store their games' controls in an API (application programming interface), and sometimes this is accessible to the public so that controllers can be remapped. If those same APIs held information on the frequency of use for each game action, people could make more informed decisions on how to remap their controllers. This is not only about helping gamers with disabilities, but a gesture toward universal design principles. Everyone could map their controllers for more comfortable or faster configurations if they understood which game actions were the most important going into the game.

This paper will now provide proposed definitions, according to one set of embodiments, for primary, secondary, tertiary, and quaternary actions. These terms could be used to start seeing game controls in a way that helps to map them to new technologies more easily. These definitions are based on the frequency of use, but frequency is also relative to the overall length of gameplay. These definitions are therefore flexible and stand as potential guidelines rather than strict rules.

Primary Actions

A primary action is a continuous action or one that is used so frequently that a player calls this action more than once per 5 seconds of gameplay. In Pacman, a primary action would be navigation because this is used constantly during play. An action that is not called constantly, but is called many times in short succession during certain (non-rare) aspects of gameplay could also be considered primary. An example of this will be explained in the case studies.

Secondary Actions

A secondary action is used frequently in gameplay, but not constantly. This action may be called once or twice per 20 seconds, or occasionally in small bursts. For adventure games, a secondary action is usually the "action" button used to pick up objects or interact with NPCs (non-playable characters, or computer-controlled characters players may encounter). A secondary action is most actions that are not used constantly, but are used multiple times per minute of average gameplay.

Tertiary Actions

A tertiary action is an action players use about once per minute or as infrequently as once every few minutes. Tertiary actions are not "rarely" used as they appear often enough to be essential to smooth gameplay. In an adventure game, a tertiary action may be jumping or perhaps using a weapon, depending on the nature of the adventure Quaternary Actions A quaternary action is any action that may be considered "rarely used" or used as infrequently to once every 5 minutes to virtually never. Quaternary actions are never used in rapid bursts and may be some of the last controls that a player may learn or discover. They may be something relevant to gameplay such as checking the map, or they may be somewhat removed from gameplay, such as accessing an options menu or saving the game. An action that is used infrequently, but is used in rapid bursts when it is called, should be considered tertiary.

Case Study: The Legend Of Zelda: Breath Of The Wild ("BOTW")

The Legend of Zelda: Breath of the Wild is a 2017 action-adventure game created by Nintendo for the Nintendo Switch. The game gained massive popularity for its stunning graphics, compelling storyline and engaging game mechanics. It was chosen for a case study because of its popularity as well as its extensive adventure-game mechanics.

Primary actions in BOTW are similar to most open-world adventure games. The two most used actions are navigational: Move, with the left stick, and Move Camera, with the right stick. These are primary actions because they are used constantly throughout the game as the player controls the hero, Link, from a third-person perspective. Even when the player is not moving Link and is, for example, navigating the inventory, the two sticks are essential.

Figure 10:
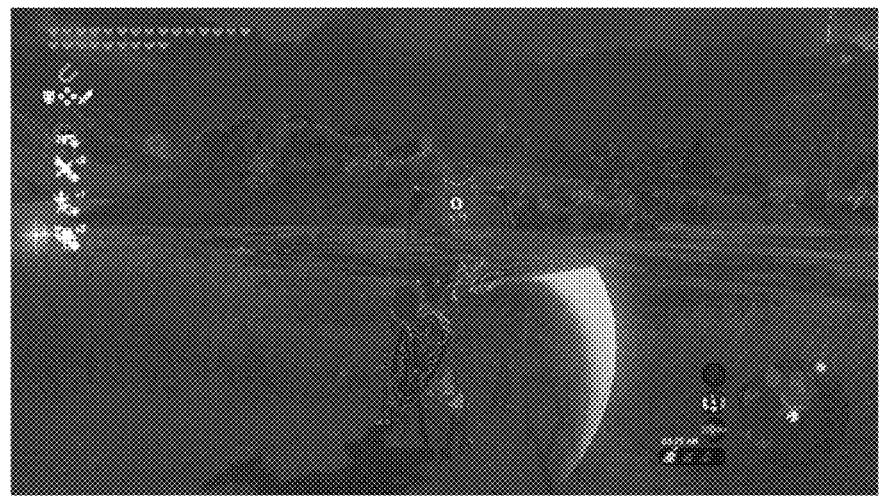
FIG. 10 shows a scene Zelda BOTW.

The only other primary action in BOTW is the Attack button, Y. Admittedly, this is a bit of an edge case between a primary and secondary action because players can effectively play the game for long periods without using Attack by avoiding and running away from enemies. However, Attack is essential to successful gameplay for all players who wish to complete the game's major quests. When players are attacking an enemy, the Attack button is used over and over in rapid succession. Enemies appear as frequently as multiple times per minute in BOTW. For these reasons, Attack is classified as a primary action. FIG. 10 shows a scene from BOTW.

Figure 11:
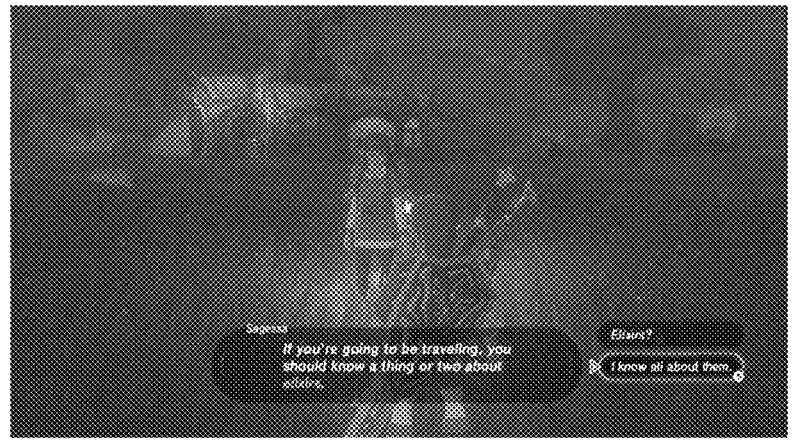
FIG. 11 shows a second scene from Zelda BOTW.

There are a few different secondary actions in BOTW. The most notable of which is Interact, or A. Players use Interact to pick up objects, talk to NPCs, and make selections in menu and inventory screens. Interact is seldom used in rapid succession, but is used frequently during gameplay. The next action is B, which doubles as both Cancel and Boost (but it will be called Cancel for simplicity). Cancel is the opposite of Interact in most ways. It is used to exit actions, end conversations, leave menus, and put items away. The same button is also used as Boost, which, when held, causes the character to run (as walking is the default) or swim fast (as wading slowly is the default). Boost can be held, but only briefly, and is not usually used more than a couple of times in succession, making it a secondary action. There are other secondary actions in the game but, for the sake of brevity, they won't be covered. FIG. 11 shows another exemplary scene from BOTW.

Figure 12:
FIG. 12 shows a third scene from Zelda BOTW.

There are more than a dozen tertiary actions in BOTW as many game mechanics are only used in specific, uncommon puzzles and situations. One of the more frequently used tertiary actions is the Pause button, +, which is a bit unique. Pause is used more frequently in BOTW than other adventure games because the Pause menu allows the player to access their inventory (food, clothes, weapons, shields, and more), view their quests, save the game, and tinker with settings. Players must access their inventory to replenish health, equip weapons, change clothes, and complete various other common gameplay chores. However, the Pause button is still only used a couple of times per minute at most and never in succession, making it a tertiary action. FIG. 12 shows yet another exemplary scene from BOTW.

Quaternary actions in BOTW are actions that players can effectively play the entire game without. These include specialized fighting moves, such as Parry (ZL+A) and obscure gestures, such as Whistle (Down on the D-Pad). These actions are helpful but not necessary and are only used in specific, rare situations. Whistle, for example, is used to call one's horse from a short distance away.

Case Study: *Mario Kart* 8 *Deluxe*

Mario Kart 8 Deluxe is a 2017 car racing game published by Nintendo for the Nintendo Switch. The game gained massive popularity for children due to its exciting, colorful graphics, simple controls, and family-friendly themes. It was chosen for a case study because of the popularity of the racing game genre and the strong contrast in game mechanics from adventure-style games, such as BOTW.

The primary actions in Mario Kart are Accelerate (A) and Steer (Left stick). Because Mario Kart is designed to be played on a single-stick controller, either stick can be used for steering when using a single Joy-Con (or a mini, single-stick controller used with the Nintendo Switch). Both Accelerate and Steer are used continuously throughout gameplay, similar to driving a real go-kart in a race. Accelerate is held down throughout the race, and the same button is used to Select menu options, so it remains a primary button even when the player is not racing. Steering is constantly demanded due to the winding game courses, and the same stick is used to navigate menus, so it is also a primary action outside of racing.

Figure 13:
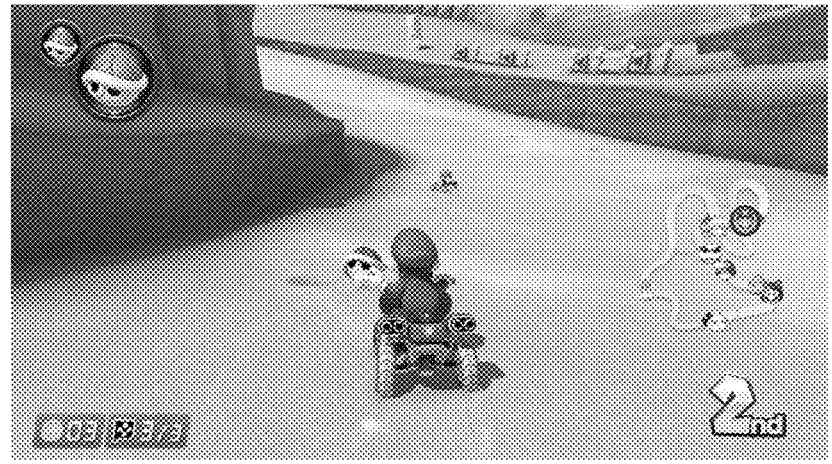
FIG. 13 shows a scene from Mario Kart 8.

While racing, players can obtain and throw special objects onto the racetrack to try to give themselves an advantage or slow down other players. Throwing these objects is a secondary action because they appear frequently on the course, and players are constantly trying to find items and determine the right moment to use them. Use Item (ZL) is also used to stop the Item Roulette, which spins before an item is awarded to the player. FIG. 13 shows and exemplary scene from Mario Kart 8.

Figure 14:
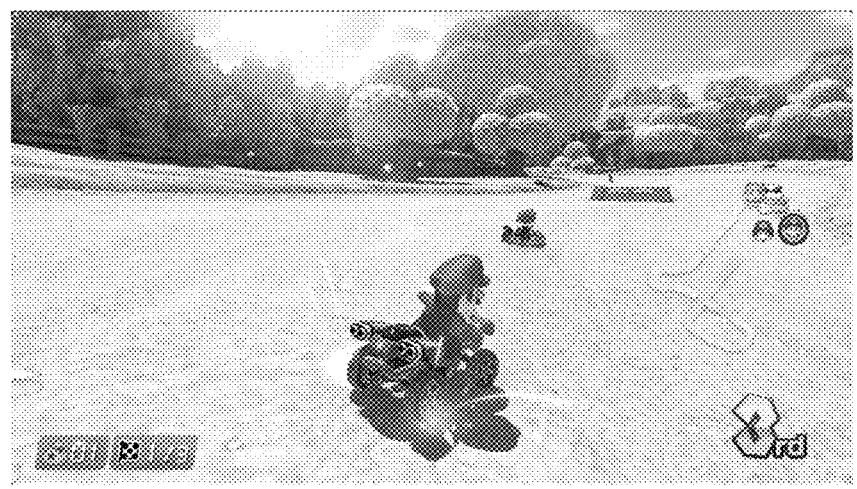
FIG. 14 shows a second scene from Mario Kart 8.

The tertiary action to be discussed is an edge case, depending on the player, and could be considered a secondary action. Drifting (ZR) can help players make sharp turns without slowing down. Skilled players drift as much as possible because they want to obtain the boost awarded after a sufficiently long drift. These players use Drift as a secondary action. Less experienced players (the majority of the fanbase) only use Drift on large or sharp turns, and some rarely drift at all. These players use it as a tertiary action. The same button is used to do a Trick after a player drives up a ramp and is airborne for a moment. Some race tracks offer this opportunity more than others, and some players take advantage of Tricks while others don't. FIG. 14 shows another exemplary scene from Mario Kart 8.

Quaternary actions in MK8D are actions such as Pause (+) and Look Backward (X). Neither of these actions is essential to gameplay. Look Backward is simply an animation and does not affect the racing. Unlike BOTW, there is no compelling reason for the player to access the Pause menu during play, other than to take a break from play. These unnecessary and rare actions are therefore quaternary.

Categorizing Controls

Game designers have long understood the relationship between how frequently a button is used and user comfort. This is one of the many factors considered when a controller is being designed as companies strive to make the controllers as accessible as possible. In this sense, accessibility means that the controller is easy to learn and considers the limitations of people's hands and fingers.

This paper will briefly discuss the most relevant use of game control categorization that the inventor found in research. This categorization is viewable in full on game designer Andrew Dotsenko's blog. Dotsenko sections a gamer's fingers into three categories: Primary, Secondary, and Support.

The thumb and index finger are Primary fingers because of their precision and flexibility, therefore they are used for Primary actions. Dotsenko defines primary actions by a few points, saying they "require active decision-making" and are "the main Verbs/basic mechanics that the player use." Primary actions "might include more than one basic inputs (aim & shoot, moving & jumping, etc.)" and "require constant attention from the player."

The middle finger is the Secondary finger because it is "flexible but not so precise." The Secondary finger is best used for Primary hold actions, which are Primary actions that require the user to hold down the button for a period of time.

The ring and pinkie finger are Support fingers because they are the weakest and least flexible. Dotsenko says Support fingers can be used for secondary actions, although he does not define these. Traditionally, The ring and pinkie fingers are only used for gripping the controller.

Figure 15:
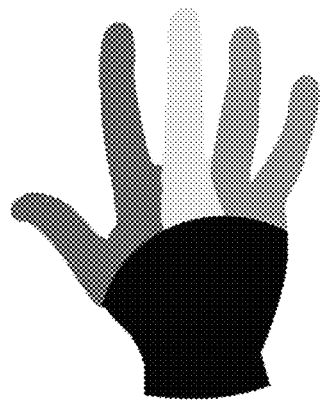
FIG. 15 shows Dotsenko's Finger Groups.
Figure 16:
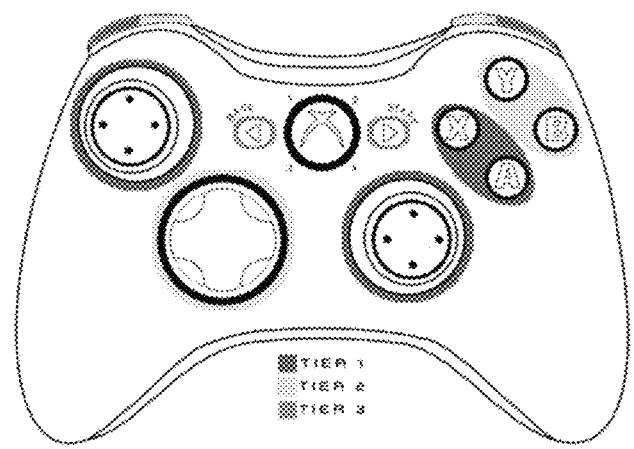
FIG. 16 shows Dotsenko's button tiers.

Dotsenko calls these categories "finger groups" and matches them with corresponding "tiers" on an Xbox controller. The controller buttons are broken into three tiers according to Fitt's Law: "the fewer the distance to the button and the bigger the button, the more accessible the button is." Buttons that are the easiest for the player to press are Tier 1, while the hardest to press are Tier 3. FIGS. 15 and 16 are from his blog describing this methodology.

Dotsenko goes on to describe various ways to group game actions and controls, but for the purposes of this paper, these will be left out. The main point is that Dotsenko's categorization is another way to think of breaking down game controls by their prominence or importance to gameplay. His example is relevant to hand controllers while those disclosed in embodiments of this paper are more relevant to head gestures or hands-free controllers, which is why his ideas (and those of many others) are not extensively covered in this paper. While controller button categorization is nothing new, most of these concepts focus on controller ergonomics instead of alternative gestures.

How Controllers Have Changed Over Time

Earlier in this document it was described how video game controllers have become more complex over time, and therefore, more exclusionary. Gaming controllers have evolved from a box with a single stick to a two-hand controller with over a dozen buttons designed to be pressed in up to 4-way combinations. However, this is not the only way that controllers have changed—controller designs have also become more neutral with time as they have strayed from the assumptions that players will be pressing certain buttons more than others. Nintendo's controllers present the best example of this transition. The discussion below will focus on one jump in particular—from the classic GameCube controller to the Nintendo Switch Pro controller.

Figure 17:
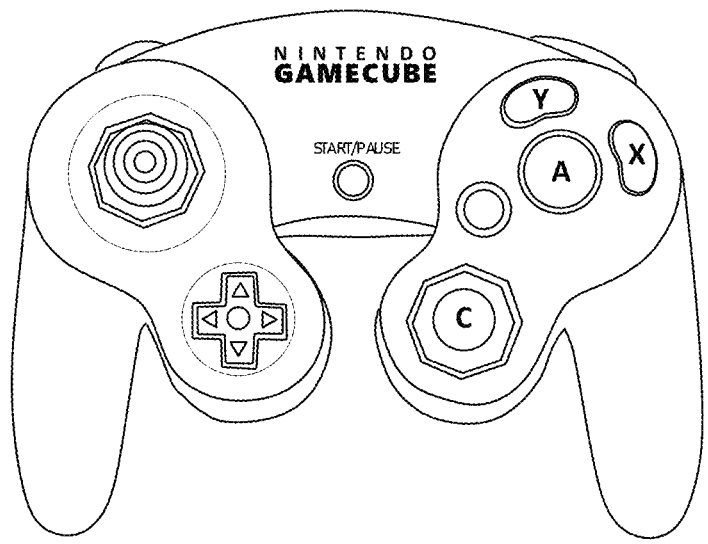
FIG. 17 shows a GameCube Controller from 2001.
Figure 18:
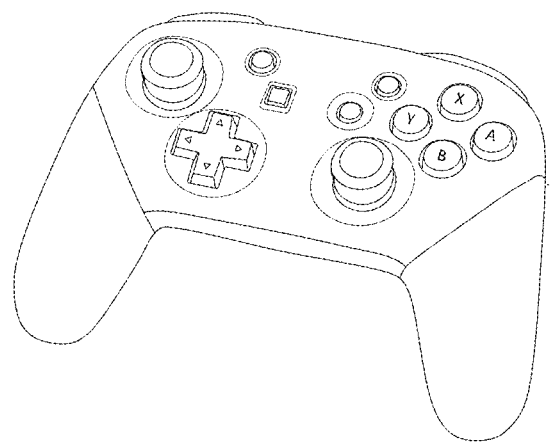
FIG. 18 Shows a Nintendo Pro Controller from 2016.

The GameCube controller was released in 2001 to pair with what was, at the time, the newest Nintendo console. It has all of the same buttons as the Pro controller, minus three (the plus and minus buttons and the screen capture button). The missing buttons are not the most striking difference between these controllers—it's the design. FIGS. 17 and 18 show contrasting images of the two controllers. These photos were taken from Wikipedia.

There are several clear differences the player will notice right away—the GameCube controller is colorful, with each button presenting as a different shape, size, and color. The Nintendo Switch Pro controller is muted in comparison—all black with uniform buttons and sticks in shape and style.

The design of the GameCube controller suggests that certain buttons will be used more frequently than others. The same is true with the Pro controller, although to a lesser extent due to the lesser variation. Looking at the GameCube controller, which controls appear to be primary controls? One may guess that the large green button (A) and the large grey stick on the left would be primary controls, intended for heavy use. What about secondary? One may guess that the red button (B) could be a secondary control, and perhaps the grey bean-shaped buttons (X and Y) are either secondary or tertiary controls. GameCube games were made specifically for the GameCube and therefore were designed with this controller in mind.

Could similar assumptions about frequency of use be made for the Pro controller? Possibly, but to a lesser extent. One may assume that the left stick appears to be a primary control, but what about the cluster of buttons on the right? Perhaps A and B are closer to the player's thumb than X and Y, but is there any other way to distinguish them? One could only guess that buttons such as A, B, X, and Y are more frequently used than the Plus and Minus buttons. However, the easily-drawn conclusions stop around there. This neutrality in design suggests that Nintendo no longer wished to make suggestions about which buttons should be used for primary actions, secondary actions and so on. But the lack of neutrality in the GameCube controller design suggests that, at one point, they did.

So why does any of this matter? When Nintendo gave more freedom to game developers regarding which buttons would be most important to access for their games, they loosened some of the uniformity of video game controls' design. Almost any button could comfortably accommodate a primary action. Games could have numerous primary actions composed of more complex combinations. But this increase in button neutrality comes with a few downsides. Players are expected to memorize the placement of the A, B, X, and Y buttons because they are no longer distinguishable without reading the print on the buttons. Games may demand players to command a greater number of buttons and combinations in less predictable groups, making games harder to learn (The GameCube has 9 buttons, while the Pro controller has 12). Finally, remapping game controls to other devices is a task that must be completed one game at a time, as all games do not use the same or similar button combinations.

Due to the diversity and complexity of game controls in modern games, the most practical approach to creating a hands-free control system is to allow ample player customization for every game. This path also takes future technologies and controllers into account, as controllers may include even more buttons with time.

Non-Binary Controls

Most of the buttons on a standard game controller are binary, meaning they are either "pressed" or not, and there is no meaningful input in between. Some gestures could be seen as binary as well. For example, a person's eyes are either open or closed. A person is either looking at an object or they are not. A person's mouth is either open or it is not. For the sake of gaming controls, pairing binary controls to binary gestures works well. However, there are a few controls that are non-binary and therefore will require gestures that are also non-binary.

Full Two-Dimensional Controls

Sticks are the most prominent non-binary controls on standard game controllers. Sticks move in a full two-dimensional circle and are sensitive to both the direction they are pushed and how far in the direction they have been pushed. This is how games allow characters to move slower or faster depending on how far the stick is pushed and to move anywhere in a 360-degree circle.

Some gestures are better than others at emulating the full range of movement for sticks. For example, it would be quite challenging to capture a stick's full range of motion with one's cheeks or eyebrows. It may be easier with one's lips, and for the right game, eye-tracking is a possibility. Perhaps the most intuitive option would be controlling the stick using head motion through tilting and rolling.

Regardless of the player's choice, the nature of the two-dimensional controls should be considered when remapping controls to head gestures. This may seem obvious, but primary controls cannot simply be randomly assigned to a player's most comfortable or highly-preferred gestured. The nature of the control is just as important as the frequency categorization, if not more so.

Other Analog Controls

The other standard controls of potential concern are the trigger buttons, commonly known as ZL/ZR (Nintendo) and LT/RT (Xbox). These buttons usually operate like binary controls, but some controllers (especially Xbox controllers) have smooth triggers that do not "click" from a binary press, like most buttons on the controller. The triggers are analog and can be pressed slightly, half-way, fully, and anywhere in between.

Most games do not use the triggers like analog buttons. This may be because not all controllers are built with analog triggers, and game developers want their games to be playable on different consoles (which will require different controllers). However, games that do have analog triggers need appropriately matched gestures for maximum playability. For example, people can smile slightly or smile widely. They may squint or they may open their eyes wide. These are examples of gestures that could be used to emulate analog controls in the rare case that they are needed. Because this paper does not include exhaustive research of all gaming controllers, it is possible that other controllers have similar analog controls, but were not mentioned. Each of these will need its own consideration to determine how it may be performed the most accurately with gestures.

Controller Map Breakdown: Nintendo Switch Pro

The Nintendo Switch Pro Controller was released in 2017 as a wireless controller to pair with the Nintendo Switch. It has 16 buttons and two sticks (which can also be pushed down like buttons, so perhaps that makes 18 buttons). This controller is the more ergonomic option over the smaller Joy-Cons. It is designed to be held with two hands with fingers positioned in what is sometimes referred to as a claw-like grip.

The controller is designed to be played with four fingers—the thumb and index finger of both hands. There are six buttons and one stick available to each thumb and two buttons on the top of the controller available to each index finger. It is rare for a player to be expected to press more than one button with a single finger at the same time. For this reason, the controller can be broken into four quadrants: Upper Left (left index finger), Lower Left (left thumb), Upper Right (right index finger), and Lower Right (right thumb). This design suggests that players are expected to use a maximum of four controls at once.

When remapping controls to a new device or gestures, these four quadrants should be kept in mind to maximize playability. In some embodiments, one type of gesture should be reserved for each quadrant. For example, just as a player would not be expected to press A and Y simultaneously, a player should not be expected to make two gestures with the same muscle at the same time (such as two lip movements or two head movements).

The quadrants need to be considered in conjunction with the primary, secondary, tertiary and quaternary controls of a specific game. These two factors will determine the most comfortable way for any one player to participate in a game. Each individual and game will be a unique pairing of abilities and controls to assemble a controller map.

To make points clear regarding some embodiments, this paper will provide an example controller map with an imaginary example person. The example person, named Ava, will be using a controller mapped for The Legend of Zelda: Breath of the Wild, discussed earlier. Ava needs a hands-free controller and will be using face-tracking and speech recognition technology for gameplay. Ava is the most comfortable using lips, cheeks and head movements. She is fairly comfortable using her eyes. She has some comfort using her voice but prefers not to use it often.

Figure 19:
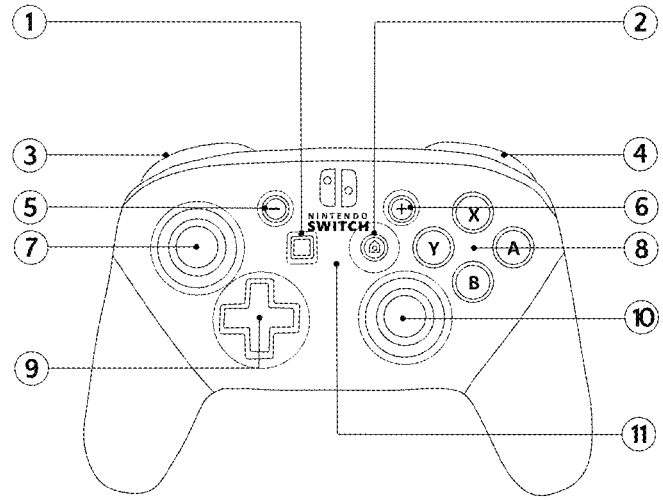
FIG. 19 shows a Nintendo Switch Pro Controller Map, Front.

FIG. 19 shows an example of a control map that Ava could try for The Legend of Zelda: Breath of the Wild. This controller map bears in mind that the Plus (+), Minus (−), Capture and Home buttons are virtually never used in conjunction with something else. In a sense, they are excluded from the concept of the four quadrants because they are used for more specific actions. The controller photos were taken from the official Nintendo website.

Note that for the sake of brevity, this table does not include every possible action from the game. There are many multi-button actions within the game, and none of those will be covered here. Also, the non-binary controls in this game are the two sticks, and both are paired with non-binary gestures. Below, there is a brief explanation for what each of the columns means.

Action: The action performed in game upon pressing the corresponding button on a Nintendo Switch Pro controller.

Button: The button on the Nintendo Switch Pro controller that is used to call the correlating action. If the button is non-binary, it will be labeled with "NB." Buttons without this label are binary.

Frequency: Based on the frequency of use, each command (button/action combination) is assigned to be a primary, secondary, tertiary or quaternary action.

Quadrant: States where the button is on the controller according to the four quadrants. A few buttons are marked "solo," meaning they are virtually never used in conjunction with other buttons, and therefore do not need to conform to a specific quadrant.

Gesture Comfort: The user's level of comfort performing the suggested gesture. Keep in mind, "low," "moderate," and "high" are relative terms. A "low" level of comfort need not mean that the gesture is genuinely uncomfortable, just not preferred.

Gesture: The suggested gesture to call the action instead of using the controller button. This is based on the user's comfort with each of the available gestures, the quadrant the button is in, and the frequency in which that button is used.

TABLE 2

Breath of the Wild Hands-Free Controls Example (Front)

| # | Action | Button | Frequency | Quadrant | Gesture Comfort | Gesture |
|---|---|---|---|---|---|---|
| 1 | Capture | Capture | Quaternary | Solo | Low | Say "Capture" |
| 2 | Home | Home | Quaternary | Solo | Low | Say "Home" |
| 3 | Use Rune | L | Tertiary | Upper Left | Moderate | Eye Squint Left |
| 4 | Throw Weapon | R | Quaternary | Upper Right | Moderate | Eye Squint Right |
| 5 | Sheikah Slate | Minus − | Tertiary | Solo | High | Head Pitch Left |
| 6 | Pause Menu | Plus + | Tertiary | Solo | High | Head Pitch Right |
| 7 | Move | Left Stick (NB) | Primary | Lower Left | High | Directional Lips Push |
| 8 | Interact | A | Secondary | Lower Right | High | Right Cheek Puff |
| 8 | Cancel | B | Secondary | Lower Right | High | Right Cheek Suck |
| 8 | Jump | X | Secondary | Lower Right | High | Left Cheek Suck |
| 8 | Attack | Y | Primary | Lower Right | High | Left Cheek Puff |
| 9 | Inventory Selection/Whistle | Directional Pad | Quaternary | Lower Left | Low | Say "Up," "Down," "Left," "Right" |
| 10 | Move Camera | Right Stick (NB) | Primary | Lower Right | High | Head Roll, Head Yaw |

Figure 20:
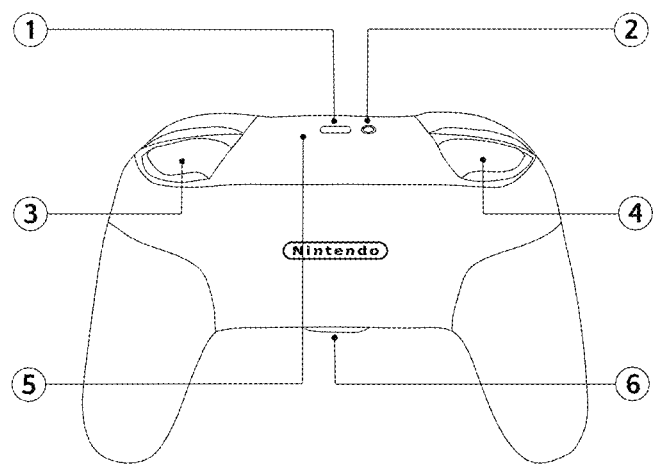
FIG. 20 shows a Nintendo Switch Pro Controller Map, Back.

The following is in regard to the buttons labeled on the back of the controller shown in FIG. 20.

Only labels 3 and 4 on FIG. 20 are buttons—the rest are labeling controller ports and other information.

TABLE 3

Breath of the Wild Hands-Free Controls Example (Back)

| # | Action | Button | Frequency | Quadrant | Gesture Comfort | Gesture |
|---|---|---|---|---|---|---|
| 3 | Use Bow | ZR | Tertiary | Upper Right | Moderate | Wink Right |
| 4 | Raise Shield | ZL | Tertiary | Upper Left | Moderate | Wink Left |

This controller map was created as an example of how a player may pair their most comfortable gestures with the most common actions used in gameplay. If possible, it is helpful to find a few gestures that could be done simultaneously and assign each to a quadrant of the controller. This allows the player to access the full range of button combinations.

Control Recommendation Demo

What if you decided not to use your hands for gaming or using a computer—what would be your first attempt at using your device hands-free? The inventor asked herself this question when approaching the technical aspect of her project. Would she try voice control? Face-tracking? Eye-tracking? There are numerous options available, each with unique advantages and challenges. However, the technology is not the only unknown variable—the human is unknown, too. Could someone play Pong with their eyebrows? What about Pacman with their lips? Could someone type with an eye-tracker? People have no idea how dexterous their faces are. It is not expected that anyone knows the accuracy by which they can use the muscles in their face.

This chapter describes the next step in a streamlined hands-free gaming experience—the assistant to games categorized by frequency of use. Here this paper will describe how people may learn which hands-free methods work the best for them.

This technical endeavor began as an exploration of hands-free gaming. The inventor wondered how she could create a hands-free game, perhaps using a virtual reality headset. As discussed above, there are already some virtual reality games that don't require hand controls and only ask the player to use head motion to play. The Unreal Engine makes creating virtual reality games simple with its out-of-the-box VR template. The inventor had some experience building games in the Unreal Engine and felt that building a hands-free game would be an opportunity to learn more about hands-free game design.

What is bothersome about this project idea was that it seemed disconnected from the point of many of the embodiments—that approaching game control maps from a perspective of frequency of use could help make video game controls more adaptable and games more accessible. While the inventor could certainly learn from the aforementioned project, the overall concept felt peripheral to many of the conceptual embodiments. This process repeated with a few other ideas—creating games that could be played using face-trackers or eye-trackers, building a VR simulation, creating a game that could be played in virtual reality and on a 2D platform, etc. The inventor surfed internet forums discussing the best video games and devices for people with disabilities and was inspired by the dozens of home-made hacks people had made for their own hands-free gaming purposes. The inventor tried out some free online software designed to give users hands-free control over their mouse, including an eye-tracker designed to replace a computer mouse named GazePointer.

While playing with the eye-tracking software GazePointer, it occurred to the inventor that both the tracker and a person's ability to cooperate with it were vital to the overall success of using the tracker as a mouse. Some of the inventor's family members had an easier time working with the eye-tracker, while others only got a headache. Even though all of us have virtually the same abilities with our eyes, our abilities in conjunction with the eye-tracker varied greatly. Further, it was difficult for any of us to determine who may achieve greater accuracy with the eye-tracker than anyone else.

This led the inventor to consider project ideas that could help users learn about themselves as well as their software or technology. For the best user experience playing hands-free video games, there must be a strong sense of control and comfort between the user and the device, whether that be an eye-tracker or something else.

Let's say someone wanted to play The Legend of Zelda: Breath of the Wild hands-free. That person would determine which controls in the game are primary, secondary, tertiary, and quaternary. How do someone pick the method by which they will operate the primary controls? Without at least a moderate understanding of which gestures are the most comfortable for themselves, the best someone could do is guess. Trial and error is a fine way to learn if one could control Link with their eyebrows or lips, but this process could be made faster and less frustrating if they knew in advance which gestures they could complete with the most comfort and accuracy.

In some embodiments, embodiments propose that a game could help people determine which gestures may be the best for each control. This game would be designed to help anyone learn about their face or head dexterity, not just people seeking hands-free gaming technology. This embodiment is inspired by universal design principles in that it seeks to be a useful tool for any curious person, regardless of ability or reason.

Figure 21:
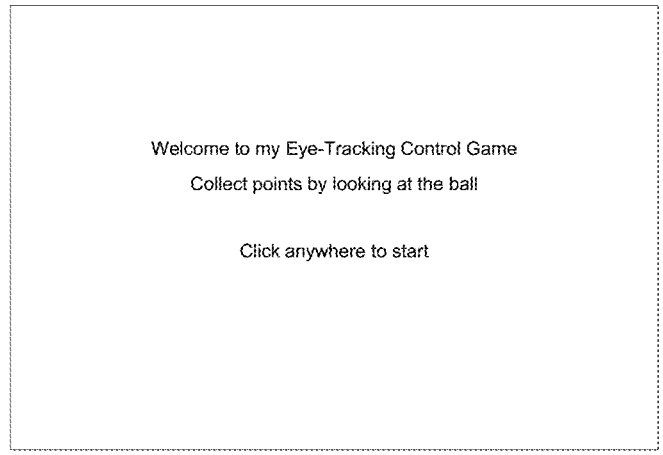
FIG. 21 shows the start screen of an eye-tracking game.

The inventor built a simple game using p5.js, which is a JavaScript library focused on making coding more accessible for people working on creative projects. The game is designed to be played using an eye-tracker but can be played in any way where the user can control a computer mouse. The start screen is shown in FIG. 21.

Figure 22:
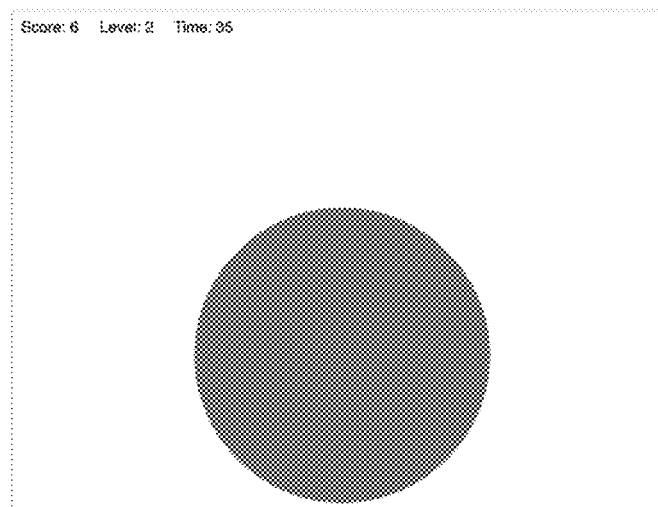
FIG. 22 shows a scene form an eye-tracking game at gameplay, Level 2.
Figure 23:
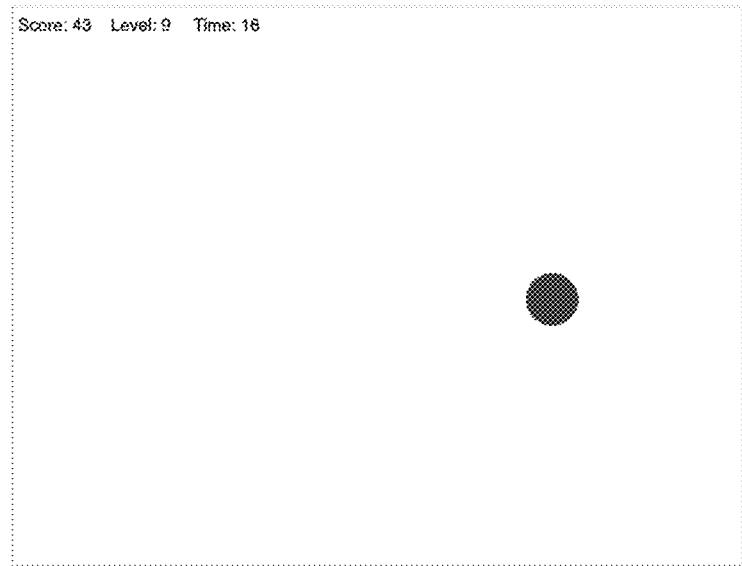
FIG. 23 shows a scene form an eye-tracking game at gameplay, Level 9.

As exemplified in FIGS. 22 and 23, the game presents the player with circles of an ever-decreasing diameter that change position and color every two seconds. If the player touches the circle with the mouse, the circle reappears in a new location and the player scores a point. The circle decreases in diameter for every five points that the player scores. The player has one minute to score the highest score possible.

Figure 24:
FIG. 24 shows the game end screen from an eye-tracking game.

As shown in FIG. 24, at the end of the game, a screen showing the player's score is displayed. This screen also offers a recommendation for the player based on the smallest circle diameter the user could touch. The recommendation is if the player's mouse control method is suitable to be a primary, secondary, tertiary or quaternary control method. For example, if the player was using an eye-tracker to control the mouse and the smallest diameter reached was larger than the size of a quarter, then this person would likely struggle to accomplish tasks such as typing or selecting small icons with the eye-tracker. This would not make a good primary control system. Perhaps eye-tracking could be used for something that requires less accuracy, such as selecting a direction to move when navigating on Google Maps.

With more time, this project could be enhanced to have a more intelligent recommendation system than what currently exists. For the purposes of this thesis, the game created is only an example to show how to create something more complex with more time and technical skills. A link to the live P5.js demo can be found in the footnotes of the priority document (a provisional application).

A Larger Accessibility Concept

While such a game as described could be a useful assistant to a gamer seeking accessibility, this project is ultimately of limited impact without much more data informing the control recommendations. Control recommendations go beyond user comfort with specific gestures—some controls are binary, while others are not. Some controls need to be pressed in sequence, simultaneously, or held for periods of time. Optimized recommendations need information about the user's hardware, available space, and the games they want to play. All of this and much more would be required for the most user-centric control recommendations experience.

After much deliberation, it was decided to take everything learned about game accessibility and outline a software that goes beyond this technical project. This interface software concept is designed to combine the efforts and information from game designers, hardware designers, and users to create a comprehensive game controls recommendation API and GUI (graphical user interface). In this software, a game that helps a user determine which gestures are the most comfortable may be just a small part. The game as described in this chapter would be a way of collecting data from the user, which is only one of the three branches of data necessary for the API of many embodiments.

Because this concept remains ultimately separate from the technical project, it is described at length in a separate chapter, which directly follows this one.

Accessibility Interface Software

Figure 25:
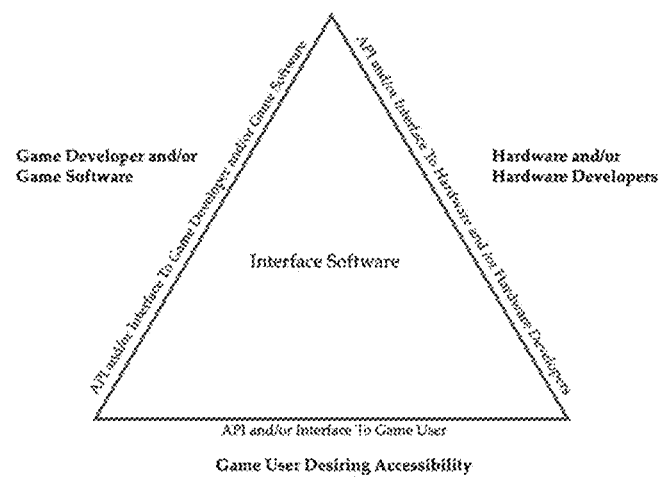
FIG. 25 shows three data sources interacting with interface software.
Figure 26:
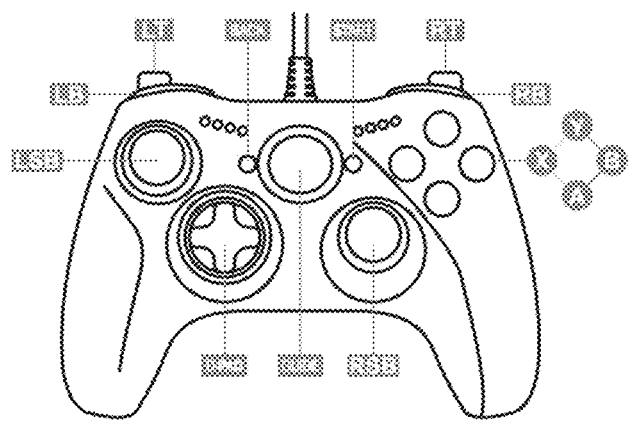
FIG. 26 shows an Xbox controller.

The concepts discussed throughout this thesis may be used to create a software product or suite. The interface software may have one or more automated interfaces to provide accessibility features for gaming. The interfaces are used to facilitate communication between the interface software's three general data sources—game software or game developers, hardware or hardware developers, and game users. This arrangement is modeled in FIG. 25, where the three data sources are shown interacting with the interface software through APIs or other interfaces. The interface software may deliver at least the following functionality to make it easier to provide accessibility in gaming:

Match user-specific capabilities to games using empirical and survey data from the user, games, and game developers Help a user play a specific game by matching user-specific capabilities with a particular game over a spectrum of hardware options Suggest games to a user based upon an analysis matching user-specific capabilities with empirical or survey data regarding a spectrum of game Suggest hardware to a user based upon matching empirical and survey data Game Developers And Game Software Game developers and game software provide important data to the interface software because relevant and reliable information about each game is required to achieve the software's objectives. Game-related information can be analyzed with respect to user capabilities to form functionally-optimized correlations between users, games and hardware. As discussed at length in this thesis, one primary goal is to optimize gameplay for gamers who cannot effectively use traditional hand controllers. Hand controllers have over a dozen buttons, as shown in the Xbox controller illustrated in FIG. 26. In order to suggest the functionally-optimized correlations listed above, the interface software requires information regarding the nature and importance of each control on each controller. Game developers are already likely in possession of the required usage statistics. For example, usage statistics can empirically illustrate frequency, duration and range statistics (for non-binary controls) relative to each particular control. Similar information may also be obtained through questions, interviews or surveys with the game developer or even experienced game users.

One way to obtain developer information is through an interface directed to developers or others sufficiently knowledgeable about the game. For example, a simple GUI may be used to solicit answers to questions about gameplay. The GUI may request answers through a Q&A implemented with checkboxes or pull-down menus. For each mode of a game, the interface may request answers regarding each game control. The questions may apply to each applicable control on a keyboard or traditional controller, including both binary controls (such as buttons) and multi-dimensional controls (such as analog sticks). The following are examples questions for binary controls:

whether the control is required for gameplay
ranking of the control either on a standard scale (such as 1-10) or among the other binary controls used by the game
anticipated frequency the control will be used during gameplay (such as constantly, often, periodically, sparsely)
how commonly the control is held for more than a few seconds
how often the control is held for more than five seconds
how often the control is used in combination with other controls
which other controls are used in combination with the control under inquiry, and for each, how often
which controls are used in close sequence to each other and how often
which controls are used in rapid succession and how often Table 4 shows an example of a graphical interface for accepting data such as the control characterizations discussed above, with LB and LT as the example buttons.

TABLE 4

Example of GUI asking for data on buttons

|  | LB | LT |
| --- | --- | --- |
| Importance of control to game? | Select ranking or grade | Select ranking or grade |
| Frequency of control use in game? | Select ranking or grade | Select ranking or grade |
| Common duration of active state in game? | Select ranking or grade | Select ranking or grade |
| Used in combination with other controls? | Select yes or no | Select yes or no |
| Select other control 1 | Select a control | Select a control |
| Frequency of use with other control 1? | Select ranking or grade | Select ranking or grade |
| Used in close sequence with other controls? | Select yes or no | Select yes or no |

As shown in Table 4, questions may be aligned with each control. While only LB and LT are shown, these questions may be asked about any or all controls on all controllers the game natively employs. Table 4 also shows queries that require nesting to gather all necessary information. For example, in gathering information regarding using a combination of controls, in order to use a GUI in table format with pull-down or menu selections, significant nesting would be necessary as shown—at least two nested questions for each potential combined control.

In another example, a GUI or an API may be fashioned to obtain empirical data regarding gameplay by one or more users. This type of data may be received in any usable form, such as flat files (spreadsheet form or comma-separated) or database files. The GUI or API may facilitate the interface software to analyze the data patterns and provide empirically-guided assessments of the nature and common use of each traditional control. For example, data for a particular game will reveal the frequency of use for each control, the frequency of combined control use, and the common control transitions (or which controls follow rapidly after a reference specific control), among other things. An API may be used to map the data fields with the corresponding query areas.

Figures 27, 28:
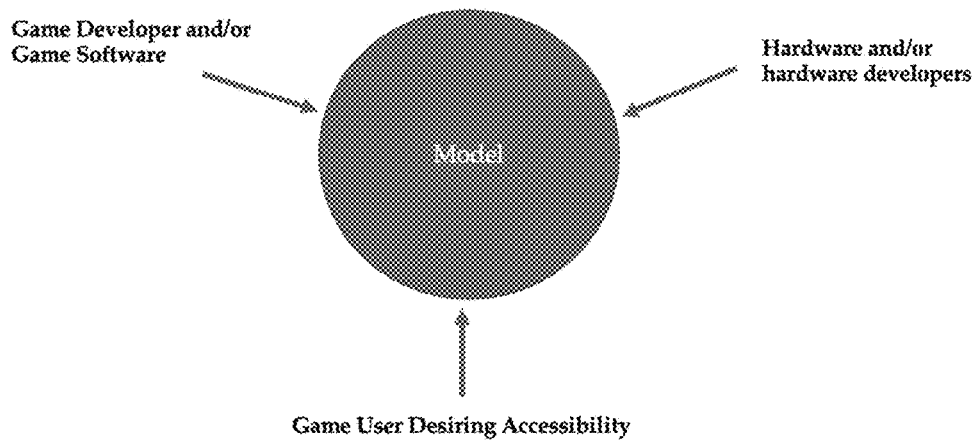
FIG. 27 shows sample APIs.
FIG. 28 shows a model for accepting data sources.

The following are definitions for the sample API formats shown in FIG. 27:

Game: The "Game" is information identifying the game for which data is submitted. The game identification may be selectable as part of the API or it may be included as an open-input text field.

Game Mode: The "Game Mode" refers to a particular mode in a game that has multiple modes. For example, in the 2020 implementation of Fortnite by Epic Games, the common mode of play is "Battle Royale," although multiple other modes are available for players to choose from (including "Save The World," "Creative," and "Party Royale"). The Game Mode field in the API identifies the mode because different controls may have different functions or importance in different modes. Like the game field, the API may provide the game mode as a selectable code, an option from a predetermined list, or an open-input text field. The Game Mode may refer to modes of a game at any level of abstraction. For example, using the Fortnite example, "Battle Royale" may be used as mode, or at a lower level of abstraction, the mode may be limited to "Battle Royale" from a specific season (or iteration of the game from a certain date).

Controller: The "Controller" field identifies the controller model used in the data to be submitted. The model may be based upon specific controllers available for selection through the API. For example, the Xbox controller model would indicate that the controls described in the data are those used on an Xbox controller. Of course, other controllers may also be represented and a generic controller model may be included in the selection. The API may define the controls for the generic controller, preferably in a way that aggregates the controls from multiple controllers.

[Column definition fields] and [Row definition fields]: By referring to column and row fields, this example of the API appears limited to flat data file forms, but it is not. The example also shows that the API does not force one type of data to be carried in either rows or columns. Different implementations of the API merely require correlation between elements data (such as game data) and operative rows or columns. In one version of the API, the developer may use the API to correlate columns with the controls applicable to the game and the identified controller. For example, assuming columns are used to carry the controls, each potential control (LB, LZ, RB, RZ, etc.) occupies a column. Further, if columns are used for controls, then rows may be used to specify corresponding data acceptable by the API such as:

Average or median control interactions per game
Standard deviation for control interactions per game
Average or median control interactions per minute
Standard deviation for interactions per minute
Average or median duration of activation
Standard deviation for duration of activation
Average or median duration between activations of the control
Standard deviation for duration between activations of the control
Average or median instances of combined use with other controls per game or per minute
Maximum number of other controls in combined use
Identity of other controls in combined use
For each other control (may be a row for each control), average or median time of combined use per game Standard deviation for each other control, average or median time of combined use per game For each other control, average or median duration of combined use per minute Standard deviation for each other control, average or median duration of combined use per minute.

A sample version of the API may express [Column definition fields] as an ordered and structured list of the controls such as [LB, LZ, RB, RZ . . . ], although other symbolism may be used for each control. Similarly, [Row definition fields] may be expressed using structured and sequenced documented mnemonics for each acceptable data type, such as the data types listed above.

The game data from a database may be used by the interface software. For example, each table from the database may be used as a flat data representation (such as row and column correlation to data types and controls). Alternatively, the interface software may interact with a database like any other application—through the database management system (DBMS). However, even with access through the DBMS, the interface software may require an understanding of the meaning of each data field. That meaning can be sufficiently conveyed by correlating the database's data fields with the applicable game controls. Using the discussion above as illustrative, each game control may be correlated with multiple data types (or database fields) such as those listed above. Sample API calls for making these correlations might appear as shown below:

---
(Game;Game Mode;Controller;[Column definition fields for table X];[Row definition fields for table X])

---

The above sample API call allows for defining columns and rows for multiple tables of a database.

(Game; Game Mode; Controller;[DBMS Correlation])

The above sample shows that database management system information may be conveyed to the interface software through a standard or structured call. Most databases and development languages have well-established structured systems (such as APIs) for use of the database from a certain software environment (for example, JDBC—java database connectivity).

The following sample shows how controls might be correlated with database fields.

(Game;Game Mode;Controller;[Controls list][Corresponding field list]), or (Game;Game Mode;Controller;[Control X][Corresponding field X]), Another way to receive information about a game is for the game developer to provide an API for its game usage data, preferably through the internet. For example, the game developer may provide APIs that allow an authorized third party, such as the interface software, to obtain usage statistics for the game's controls. The API can be used by the designers of the interface software to ascertain the usage data necessary to make optimized correlations with a set of accessibility controls, such as controls of a hands-free headset.

While it may seem burdensome for every game developer to provide these types of APIs, many games could provide APIs of this type merely by making adaptations to the most common game development engines. These engines are used to develop and compile an extremely large number of commercially available games. For example, development systems such as Unity or the Unreal Engine provide platforms to develop and implement games for commercial exploitation. By definition, these development platforms map game action to traditional game controls such as those in handheld controllers. Thus, the production of game usage data or an API to provide access to such data may be built into the development platform and then applied to every game produced on the platform. Again, this may sound onerous but much if not all of this work is already done. For example, both Unity and the Unreal Engine provide facilities such as APIs for analytics. These facilities might be used as-is or adapted for purposes of the interface software. Therefore, the interface software may be able to obtain information regarding a huge number of games by accessing APIs or other information sources that are provided by the game developers.

Hardware And Hardware Developers

Many types of hardware may couple to the interface software. For example, all of the following and more might be useful: cameras, all types of motion sensors (such as accelerometers, infrared sensors and LIDARs), proximity sensors, and any device that can detect sound, movement, light or environmental changes of any kind. In addition, modern sensors such as cameras may operate with dedicated software to analyze the sensor output and provide conclusions that might be used by the interface software. The output of this type of software is treated as hardware for the purposes of this discussion. Some examples of these types of hardware/software pairings are: camera output analysis providing conclusions about the status of eyes (open or shut), mouth (open or shut, smiling or frowning), or other facial status; or, LIDAR output analysis providing a conclusion regarding the distance between two objects.

For each hardware device, the interface software may provide an interface such as an API so that a device can be interpreted by the interface software. For example, the API will allow a developer to pair the device with the interface software so that the interface software may in turn provide the functionality of the device for gaming accessibility. The output of a device may be used alone or in combination with other device outputs or game data to map to accessibility game controls. For example, a motion sensor may output a range of values that indicate a head nod to be analyzed by the interface software. The head nod may then be mapped to one or more binary controls. A single binary control may correlate the sensor output to either a nod up or a nod down. Alternatively, multiple binary controls may correlate the sensor output with multiple sub-ranges in the full range of motion indicated by the device output.

The following is an example of a device with an output range between 0 and 19 being used for a single binary control:

0 through 9 equals binary "on"

10 through 19 equals binary "off"

The next example demonstrates how a single control may have three or more states:

0 through 6 equals binary "on"

7 though 12 equals no decision 8 through 19 equals binary "off"

The following is an example of a device with an output range between 0 and 19 being used for two binary controls:

0 through 4 equals binary "on" for binary control A 5 through 9 equals binary "off" for binary control A 10 through 14 equals binary "on" for binary control B 15 through 19 equals binary "off" for binary control B The following is an example of a device with an output range between 0 and 19 being used for two binary controls with three or more states:

0 through 3 equals binary "on" for binary control A
4 equals no decision
5 through 8 equals binary "off" for binary control A
9 through 10 equals no decision
11 through 14 equals binary "on" for binary control B
15 equals no decision
16 through 19 equals binary "off" for binary control B As another example, a combination of motion sensors may output multiple ranges of values that indicate a two-dimensional position of the user's head. That two-dimensional position may in turn be analyzed by the interface software and mapped to game controls. The two-dimensional head position may be mapped to a two-dimensional game control such as an analog stick. One potential way to make such a mapping is to correlate ranges of (X,Y) sensor data with ranges of (X,Y) analog stick data.

Since discrete sensor hardware devices tend to have standardized output, a correlating standard API may be designed for a large group of common devices, such as hardware IR, Lidar, accelerometer, camera, etc. However, the sensor output alone does not provide any information regarding the state of a user because any particular sensor may be applied to a user in any number of ways. Therefore, the API should provide for correlation of the sensor output with a user status. The following is a sample API correlating the sensor output with a user status:

([sensor output range X],[corresponding user status X])

The use of the variable "X" in the example above is to indicate that this type of API statement generically provides for correlating multiple output ranges of the sensor with multiple user status situations.

As discussed above, some examples of user status are as follows:

Right eye open/squint/closed
Left eye open/squint/closed
Gaze angle of right eye
Gaze angle of left eye
Right eyebrow raised/relaxed
Left eyebrow raised/relaxed
Right cheek inflated/relaxed
Left cheek inflated/relaxed
Smile present
Frown presence
Top lip recessed/prominent
Bottom lip recessed/prominent
Jaw position (3 dimensions)

As noted in above, no discussion of hardware is complete without recognizing the current status of virtual reality hardware, which may provide all the sensor activity necessary for an early version of the interface software. Since virtual reality hardware already evaluates the use of its sensors for gaming and provides access to gaming software developers, the interface software may make use of the same access to provide its functionality. Further, game development platforms (such as Unity or the Unreal Engine) are already programmed to interact with a variety of hardware and provide those interaction abilities to games developed on the platforms. In other words, game development platforms already interpret hardware outputs and correlate those outputs with user status so that game software may react in gameplay. With respect to games developed on these platforms, the interface software can simply leverage the hardware interpretations provided by the development platform software. This is why some embodiments suggest that the most efficient manner to add new hardware capabilities to scores of games may be to enhance the game development platforms to serve a range of accessibility hardware by correlating the hardware output with the desired user status, such as those discussed above.

Gamers Desiring Accessibility

A primary purpose of the interface software is to serve the particular needs and desires of game users requiring accessibility. Those needs and desires may be highly individualized to the user. The interface software may determine those needs and desires through two primary techniques. First, a GUI may be used to query the user or their caretaker regarding the user's desires and abilities. The following provides a sample of information that may be obtained from a user through a GUI, such as a menu with pull-downs, checkboxes, or free-form fields for user input:

Identifying types or genres of games desired (first-person shooter, adventure, casual, etc.)
Identifying a favorite game
Identifying a list of favored games, perhaps ranked
Identifying hardware that the user has or may acquire
Queries regarding user abilities relating to fingers, hands, toes, feet, arms, elbows, shoulders, wrists, knees, ankles, neck, mouth, lips, jaw, cheeks, tongue, eyebrows or eyes
Querying regarding user proficiency with different identified hardware devices In addition to a GUI, the interface software may interpret sample gameplay or playtesting by the user to determine the user proficiency and skills (such as listed and discussed above) or user preferences. Gameplay may be analyzed in a number of ways. The easiest way to analyze gameplay may be through game system resources or game development kit resources provided for developers. Depending upon the game system or development kit, these resources may include activity logs, gameplay statistics and other resources. The data received from these resources may be analyzed by the interface software to determine the relative abilities and preferences of the user.

Another way to analyze gameplay is to run a software module of the interface software on a game system while a user is playing enabled by accessibility hardware such as a headset. The module may be designed to collect and log any data desired so as to monitor any user activity that the sensors are capable of perceiving and correlating that information with gameplay. In the absence of special arrangements, the module may require the user to play in a system developer mode so that the game and the interface software module may be simultaneously run.

Yet another way to analyze gameplay is through playtesting modules that may be a part of the interface software. An illustrative playtesting software may be a game or an exercise, such as the eye-tracking game discussed above, that tests a user's abilities and preferences when using accessibility hardware. This concept is discussed at length above as the technical aspect for this thesis. Playtesting modules have the advantage of directly accessing the user skills desired by the accessibility designers. Of course, by itself, a playtesting module would not necessarily collect or log the appropriate data, so the techniques discussed above remain relevant.

Finally, user analysis and interaction may be materially aided by using or altering the facilities provided by game development systems such as Unity or the Unreal Engine. These game development systems may equip game software with the ability to run a monitoring module for collecting accessibility data or to run playtesting modules. Importantly, because the game development system is inextricably part of the games themselves, a data collection module or playtesting module may be extremely tailored to the play or a particular game with respect to particular accessibility hardware employed by a particular user.

Using The Interface Software To Provide Accessibility

In order to make accessibility suggestions as discussed above, the interface software may use the data collected through the interfaces to make inferences regarding the correlation of hardware or traditional controls with accessibility controls. The interface software may present the collected data to the user in a visually accessible form and allow the user to make the control pairings. A more streamlined process requires that the interface software make the final control correlation determinations rather than the user.

FIG. 28 shows that a model may be used to aid with making final determinations regarding control correlations. A purpose of the model is to determine and use the relevant data in the priority order suggested by the collected data. Designers may differ on the exact nuances of such a model, and the determination of the best or better models will undoubtedly be a matter of trial and effort. Further, differing models may be more useful for differing types of users or games. For these reasons, the interface software concept is envisioned to accommodate any model.

Figure 29:
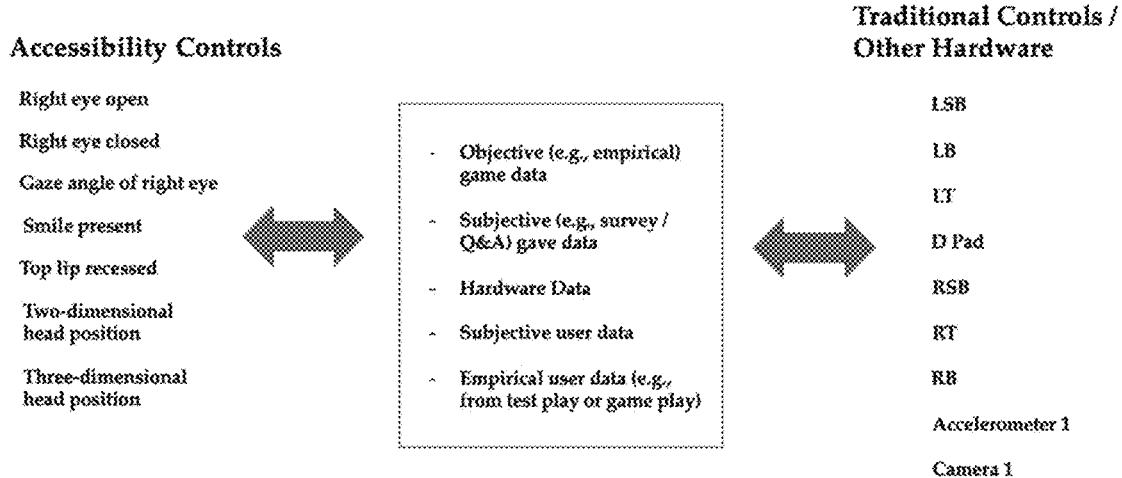
FIG. 29 shows a sample of how interface software uses collected data to correlate controls.

One example of a model is illustrated in FIG. 29, which shows that the illustrative model seeks to use the collected data to correlate controls. FIG. 29 shows on the left an exemplary list of accessibility controls, and on the right side an exemplary list of hardware and traditional controls.

FIG. 29 also shows an exemplary list of the data collected by the interface software and discussed above. The concept of this illustrative model is built around the controls, which the model views as objective. There is a finite and known set of controls or hardware that may be accessed by a particular game and there is also a finite and known set of accessibility controls available to a user and the software. The concept of the model is to use the collected data to create appropriate and ideal correlations between the two types of controls.

Figure 30:
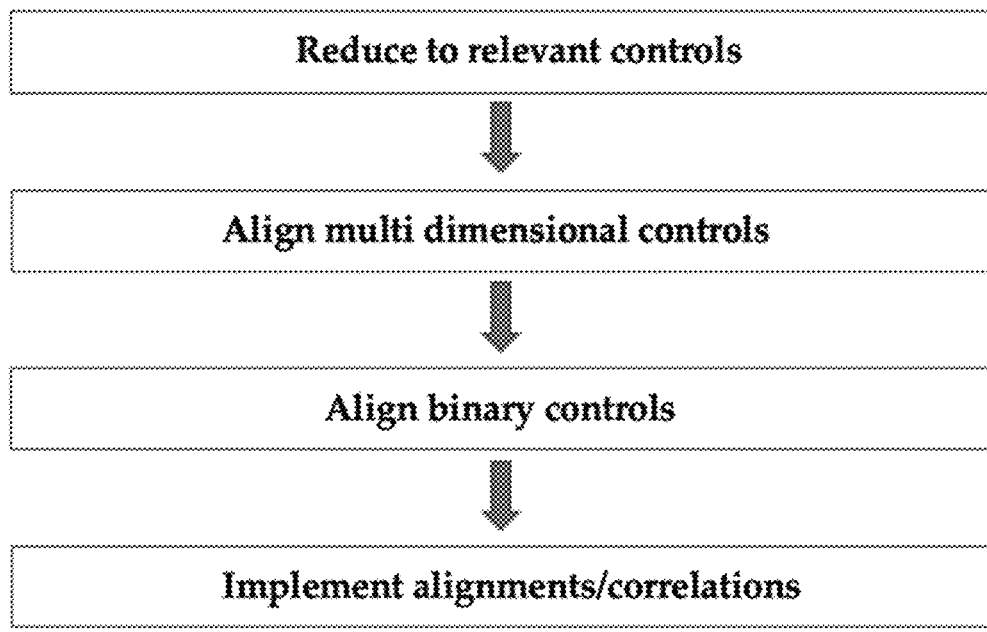
FIG. 30 shows a high-level flow chart associated with embodiments hereunder.

FIG. 30 shows a process that may be implemented to apply the illustrative model. The process may be implemented in software run on any suitable computing hardware. Initially, the process seeks to reduce the set of traditional controls to the relevant set under consideration, as shown in FIG. 31. Therefore, any controls that are unused by or unavailable to the game should be eliminated, reducing the list to only practically relevant controls. In addition, as shown in FIG. 31, during this first step, the list of accessibility controls should also be tailored to the practically available set. For example, the list might not include accessibility controls that are unavailable to the user due to hardware constraints or due to a user's known physical limitations.

The second step in the process of FIG. 30 is to use the collected data to align multi-dimensional traditional controls with accessibility controls of like dimension. The third step of the process of FIG. 30 similarly aligns binary controls from the traditional list with the accessibility list. While opinions may differ on priorities for alignment, in one possible model implementation, the following list of priorities is applied:

User Mandates Regarding the Use of a Control

Align traditional multi-dimensional controls requiring a certain degree of accuracy with multi-dimensional accessibility controls for which the user has a predicted accuracy of a similar degree or higher.

Align traditional multi-dimensional controls requiring a certain level of repetitive use with multi-dimensional accessibility controls for which the user has predicted tolerance for a similar level of repetitive use or higher.

Align traditional multi-dimensional controls requiring a certain level of rapid directional change with multi-dimensional accessibility controls for which the user has a predicted ability of rapid directional changes at a similar level or higher.

Align traditional binary controls requiring a certain level of repetitive use with binary accessibility controls for which the user has predicted tolerance for a similar level of repetitive use or higher; but only if: the alignment allows for combined controls uses that are predicted as tolerable for the user; or there is no tolerable alternative.

In aligning controls with respect to combined control usage, binary controls that are predicted best for combined uses should be prioritized as long as the required level of repetitive use is not intolerable to the user based upon data or user mandate.

The final step of the process illustrated in FIG. 30 calls for implementing the alignments, which refers to changing the state of the gaming systems so that the preferences are implemented. Simply put, this step involves either programmatically or manually setting the game to use the selected controls for the identified purposes. By way of example, many games allow controls to be mapped per the user's direction. This step completes that mapping, although perhaps with a set of controls that is not readily available at the time of this writing.

FIG. 32 shows further detail to the step of aligning multi-dimensional controls. As shown, the first step is to determine the set of multi-dimensional controls required for playing the game under consideration. This may include creating a list of multi-dimensional controls and noting the requirements use indicators for each. Next, a determination is made regarding the available multi-dimensional accessibility controls. Similarly, a list may be constructed with each control accompanied by its constraints and usability data. Next, user mandates or learning from prior attempts should be applied. For example, if a user has mandated a certain alignment or declined to use a certain accessibility control, the user's indication should be followed. As another example, if a prior attempt of the same analysis has proven undesirable to the user, then any indication from that experience should be applied (for example, a user having reaction or endurance issues with one accessibility control may indicate using a different accessibility control). In the final step, the alignment is made and priorities should be applied such as the priorities listed above.

Figure 33:
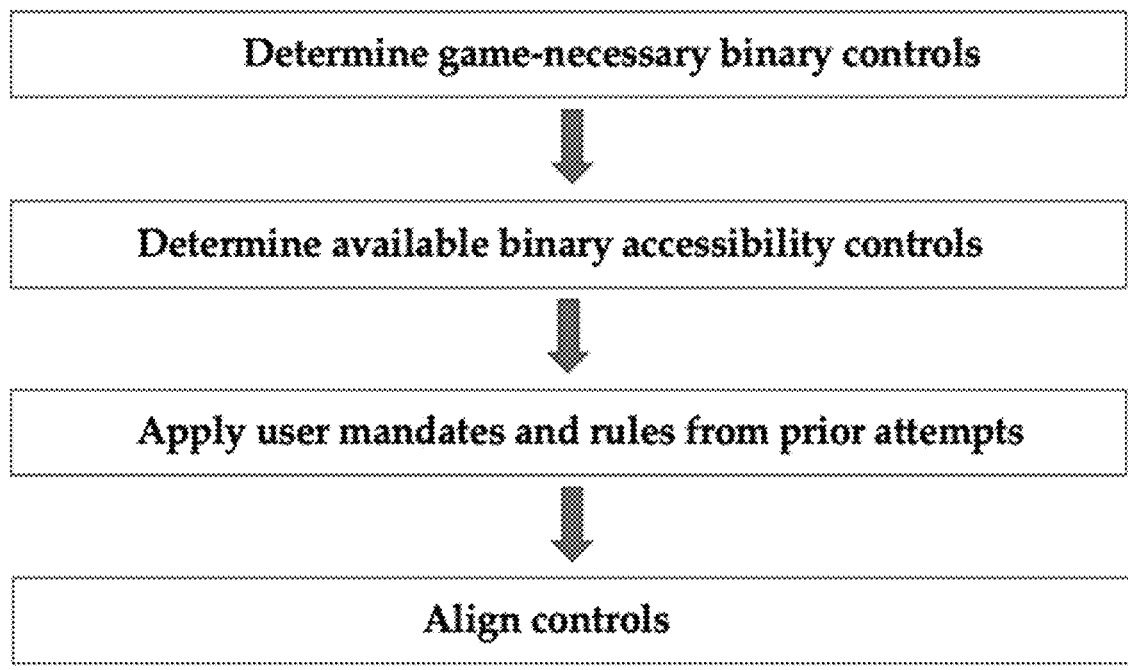
FIG. 33 shows a flowchart relevant to aligning binary controls from FIG. 30.

FIG. 33 shows further detail on the step of aligning binary controls. The discussion with respect to FIG. 32 applies here as well.

Enhancing Accessibility

Referring to the topics above, at least four ways to enhance user accessibility were suggested. Each may be implemented using the model and illustrations provided above.

Match user-specific capabilities to games using empirical and survey data from both the specific user and the games and game developers.

The model and process discussed above are directed to this generic use of the interface software.

Help a user play a specific game by matching user-specific capabilities with a particular game over a spectrum of hardware options.

In adapting the processes discussed above, if a user wishes to play a specific game, the hardware controls should be limited to those applicable to that particular game.

Suggest games to a user based upon an analysis matching user-specific capabilities with empirical or survey data regarding a spectrum of games.

To adapt the model and processes discussed above, each game under consideration should be processed separately and a compatibility score should be applied to each. The compatibility score may be based on how often or by how much the predicted user abilities for each accessibility control exceed the predicted requirement for the traditional control. The highest scored games may be recommended to the user.

Suggest hardware to a user based upon matching empirical and survey data about the user.

In some embodiments, to adapt the model and processes discussed above, the process should be run multiple times using:

A core set of accessibility controls or a large set of generic accessibility controls should be used in several runs of the process. Each run of the process should use a different set of traditional controls, and each set should be scored as discussed above. Each set of traditional controls should be based upon a single existing hardware system, such as different VR headsets or different combinations of discrete hardware and VR headsets.

The user may be advised of the hardware rankings based upon the result of the process runs separately for the core and large generic accessibility control set. This will allow the user to understand the best equipment for more simple games as well as the best equipment for more complex games or versatile usage.

Hands-free gaming is by no means the most popular form of gaming, nor is it considered "normal" to use head gestures instead of classic console controllers. Further, gaming culture has become comfortable assuming that players with disabilities are responsible for their own gaming experience. This means researching and buying new technologies and controllers as well as inventing entirely new devices and workarounds. To struggle to play is the norm for a disabled gamer. The project rejects the notion that gamers are expected to invent and re-invent control systems to accommodate inaccessible game design. The inventor challenges game designers to step up to the plate and unlock their controls systems—make their APIs easy to access and filled with all the information a gamer would need to remap all the actions in the game to new controllers.

While discussing this project with friends and family, one of the most common inquiries received was how anyone could possibly play a game using facial gestures. It occurred to the inventor that there is a fundamental misunderstanding surrounding hand controllers—that is, that hand controllers are inherently intuitive and easy to use. In fact, they are not! This is no more a matter of science than stating that learning to tie one's shoes is not intuitive, nor is writing, playing guitar, or using a smartphone. Everything we do with our hands is learned, usually at the cost of hours of practice. Video game hand controllers are particularly difficult to master. Even life-long gamers complain of sinking dozens of hours into learning game controllers that are only slightly different from those they use regularly.

All of this is to say that there is nothing outlandish about using one's face, feet, head, or anything else to play a video game. It is a matter of learning to use certain gestures with greater precision over time, just like hand controllers. Challenging the notion that hand controllers are the only "easy" or worth-while controllers to learn will help gamers and game designers consider other possibilities, making gaming more accessible.

Consider another art: dancing. Traditionally, dancing is a full-body activity, using muscles from the feet up to the head. Dancing usually requires a bit of space so one may dance unobstructed. Belgium dancer Annika Verplancke wished to challenge the normativity of needing space and full-body movement by performing "face dancing." She posted several videos of her original face dances on her Instagram account, encouraging her followers to try as well. The videos feature her from neck-up, using only her face and head to move to the beat of the music. This is, in effect, how it is hoped to have challenged video game normativity in this thesis—by demonstrating that many of the boundaries of game controllers are purely imaginary.

When one starts to consider improvements for accessibility, one will naturally encounter universal design principles. Even though this thesis does not specifically address each time a universal design principle is present, these guides are nonetheless the backbone of many of the embodiments and the interface software concepts. One of the ways this project contributes to the gaming industry is by encouraging and supporting the use of these guides through both academic and empirical research. For the purposes of this section, this paper will briefly visit a few of the universal design principles (as they are stated by the National Disability Authority's Centre for Excellence in Universal Design) that were found the most relevant to these discussions. These are the first, second, third, and fifth principles.

The first principle is that of equitable use, or a design that is useful to people with a wide range of abilities. This paper will not dive into this too deeply for fear of stating the obvious—the embodiments focus mostly on including as many gamers as possible to the community, covering a vastly greater range of abilities than common game controllers. While the main goal was to help gamers achieve a better hands-free gaming experience, both the technical project and interface software concept invite gamers of all abilities to experiment with new control systems. This is because hands-free gaming technology can serve communities beyond gaming. Imagine, for example, hands-free alternatives to every-day activities such as driving or using a microwave. Software that can help someone learn about hands-free options in gaming or elsewhere is useful regardless of ability, as it opens doors to future methods and technologies. These new designs would make tasks easier for some, but for others, would make some tasks possible.

The second principle is flexibility, meaning that the product design is flexible to a wide range of abilities. Because the concepts rely on a diverse set of commercially available accessibility software and hardware, a wide range of abilities are accommodated. User comfort, precision, and accuracy is also at the forefront of the inventor's experience designs as these inform the hardware and controls recommended to the users. Flexibility in game design is also one of the major discussions, as games are often designed with only traditional hand controllers in mind. This form of leniency relates to points about casual games and happiness, discussed in Ancillary Information A below. Casual games allow players to come and go from gameplay as they please, with little or no penalties. This makes the games more accessible because they do not require long durations of playtime to advance and have fun.

The third principle is regarding simple and intuitive use. As a user experience designer, nothing tickles the inventor more than a simple and intuitive solution to a complex problem. However, the inventor cannot prove that the inventive designs hold these virtues without user research and testing. This project, however, was a quest to determine how to eliminate unnecessary complexity from the hands-free gaming experience. It was desired to find a way to add consistency to gaming accessibility, thus the invention of the tiered user comfort and frequency of use system for controls. It was desired to relieve some of the responsibility of the user to create their own hands-free experience by relocating the work on the game developer or a software such as the APIs and GUIs discussed above. Whether or not these concepts are truly user-friendly can only be speculated, but they present embodiments enabling a far simpler experience than what currently exists.

The fifth principle is tolerance for error, or a design that does not punish the user for accidents. This concept is addressed early on in the thesis with the discussions of flow, Piero, and happiness. Low stakes for failure is one of the four essential ingredients to reach a state of flow, or a joyful, immersive form of productivity. Flow is essentially optimal user experience, and that stretches to gaming, education, and beyond. One of the ways this principle was considered in designs is with the eye-tracking demo game. Free online eye-trackers offer poor accuracy, and even high-end trackers only offer precision to about the size of a quarter. This was factored into the game and writing the control recommendation. For example, the game never requires the user to hover in one place for too long because it is known that the eye-trackers make it difficult to hold the curser in a small area. Even though the "idle" gesture is common in eye-tracking products, it was decided to build in as much error-forgiveness as possible because users could be using very low-grade eye-trackers.

Ultimately, all seven of the universal design principles are relevant to this thesis, but for brevity only the most applicable were discussed.

Partial Game Design

For decades, games have offered various modes for different difficulty settings and types of play. This helps make the same game entertaining for more age groups and for a longer period of time. The classic modes of "easy," "medium," and "hard" eventually evolved into something more complex—games that intelligently predicted the game mode that created the most fun and optimized experience for the player. For the sake of this thesis, these are "partial" games, or games that favor the success and enjoyment of the player. Partial games bend to the needs and skill-level of the player rather than requiring that players meet the demands of the game. Impartial games are non-reactive to the skills and experiences of the player, and the player cannot effect the difficulty or requirements for the game. These games are called "impartial" because they do not favor the success of the player, nor can this be changed in the settings.

One game that has seen stunning success for its partial design is Epic Games' Fortnite. In Fortnite, players are placed in an arena of 100 competitors composed of other active players and some artificially intelligent robots. The object of the game is to be the last person alive in the arena. While the game is in the shooter genre, players need not engage in much shooting to win a match, instead using various tactics including building structures, setting traps, hiding, and using vehicles to survive and eliminate other players. Further, Epic Games designed an algorithm that places players in matches with other players of a similar skill level and play style. This allows players to learn at their own pace and compete in evenly-matched battles. It also allows players who have not learned more advanced tactics, such as building structures, to engage in the game with other players who have not mastered the same skills.

There are dozens of other partial games that favor the success of the player in various ways. Some games are partial by giving the player many different ways to succeed. Other games allow players to change the parameters of the game to make it more manageable or fun for them (for example, by decreasing the number of enemies or increasing the amount of time permitted to complete a level). There are even games that offer a "sandbox" mode, where certain parameters are changed to make gameplay a free-form and casual as possible (this may be giving the player unlimited money, invincibility, maximum power-ups, etc.).

Partial games are becoming more popular as concerns about accessibility rise, but the accessibility of game controls is lagging. Some games allow players to customize major controls, although few allow full customization and virtually none offer intelligent adaptation systems. The world is distinctly lacking partial game controllers.

What does a partial game controller look like? This is described in depth in above, although remains largely nebulous at the nuance level. It would likely require the cooperation of game designers, hardware designers, and users to create an experience that was fully adaptive and customized for the individual. The teaching above describes how an interface software and API may streamline the data collection and control optimization process, and why this may be the most realistic option for the future of control accessibility. While it may seem a daunting task to recruit all the necessary cooperation, much of the hardware and API work is already done and needs only to be optimized for user access. The reality of accessible hands-free gaming is not as unreachable as it seems. One of the largest contributions this thesis brings to the gaming industry is the imagination, conceptualization, and ultimately a case for partial game controls design.

Games are an ever-increasing part of cultures and everyday lives around the globe. In this way, game designers have become an incredibly powerful and influential part of society. With great power there is, of course, great responsibility, as millions of people cannot participate in video games simply because video games have not been designed for them. Yet.

The current experience for hands-free gaming is tedious—from acquiring the proper hardware or software to match a specific game, to remapping controls or finding workarounds for controls that are too difficult to access. Some gamers ultimately find that this effort is not worth it for the gaming experience achieved. However, everything we need for adaptable, flexible, highly-accessible gaming technology already exists, from the sensors to the data. These need only be enhanced and combined using the collaborative efforts of game designs, hardware engineers, and the users to produce optimized experiences.

The first step to this process is to create a common language by which to discuss controls. This is a baby-step toward uniting the gamers and designers. Thus, the creation of the frequency-of-use tiered system discussed above—by categorizing controls by their relevance to gameplay, gamers and designers can start making smart pairing decisions with controls. This, paired with an open-access API of the available controls for a game, would be a massive leap for gaming accessibility, and its production would cost minimal time and money on the side of the game company.

The second step would be introducing smart hardware and software into the mix—devices used to help assess the user's abilities and determine which could be the most successful at which controls or games. This is demonstrated in a highly-rudimentary way in the eye-tracking game, which may be used to determine the usefulness of a particular eye-tracker to a particular user. This is just one of many ways that hardware is vital to the user's success and comfort (for example, using one camera for an eye-tracker software as opposed to four).

The third step would be the interface software concept described above. This is the leap forward that may be hovering just above the horizon—a gaming accessibility industry that has harnessed the full cooperation of game designers, hardware designers and the userbase to serve the accessibility needs of people with a massive range of abilities. This invention sounds too good to be true, but it is not an if, but when this automation will arise. As discussed previously, as far as certain technological advancement, we are already here.

If someone were to pick up this research after me, this is the first thing suggested—find users, talk to them, ask them to play the demo and interview them about their dreams for accessible gaming. All other research and development should move from there.

Something realized while embarking on this project is how easy it is for people to feel detached from problems concerning accessibility. This is somewhat natural considering most people worry about their own problems and inconveniences that pertain to them specifically. If everyone constantly worried about everyone, we would all drown in anxiety. However, what goes underappreciate is how much accessibility (or the lack of it) does pertain to us, and everyone.

As people age, certain abilities will fade and others will be lost to illness and accidents. Should an individual have the privilege of living a long life, they will inevitably face a disability of some kind. Thus, a whole generation of gamers—billion of people—will age as well, and as is nature, will lose abilities. A few decades from now, there will be millions of life-long gamers facing the challenges of accessibility in gaming, and the gaming and design industries will be responsible for producing games and controllers for wider and wider ranges of abilities. This is why topics such as hands-free gaming need to be tackled as soon as possible—it is only a matter of time before the demand for such accessibility is far greater than the speed at which such technologies can be created. These technologies will be vital to keeping gamers connected to their communities as they age. It's never too early to start working on a better future, so the best time to start thinking about these realities is now.

Ultimately, this project resulted from the inventor doing what user experience designers do—researching a subject, listening to what users have to say, and illustrating what could be the best way to serve the users. The UX designer is, after all, an advocate of the people. This thesis can serve as an elevator pitch as to why hands-free gaming technology is an invention worth one's time and effort. It was certainly worth mine.

Reference Hardware

In the description herein, for purposes of explanation, numerous specific details are set forth in order to provide a thorough understanding of the inventions. It will be apparent, however, to one skilled in the art that the invention may be practiced without these specific details. In other instances, structure and devices are shown in block diagram form in order to avoid obscuring the invention. Moreover, having originated as an academic thesis, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "a computer system" can refer to a single computer or a plurality of computers working together to perform the function described as being performed on or by a computer system. Similarly, a machine-readable medium can refer to a single physical medium or a plurality of media that may together contain the indicated information stored thereon. A processor can refer to a single processing element or a plurality of processing elements, implemented either on a single chip or on multiple processing chips.

A graphics processor unit (GPU) is a specialized electronic circuit designed to rapidly manipulate and alter memory to accelerate the creation of images in a frame buffer intended for output to a display. GPUs are also used for non-graphical parallel processing, sometimes referred to as "compute processing," in addition to graphics processing.

Embodiments described in more detail herein allow software developers to prepare applications using a programming language that complies with a language model that is designed to assist developers to write efficient programs.

Figure 34:
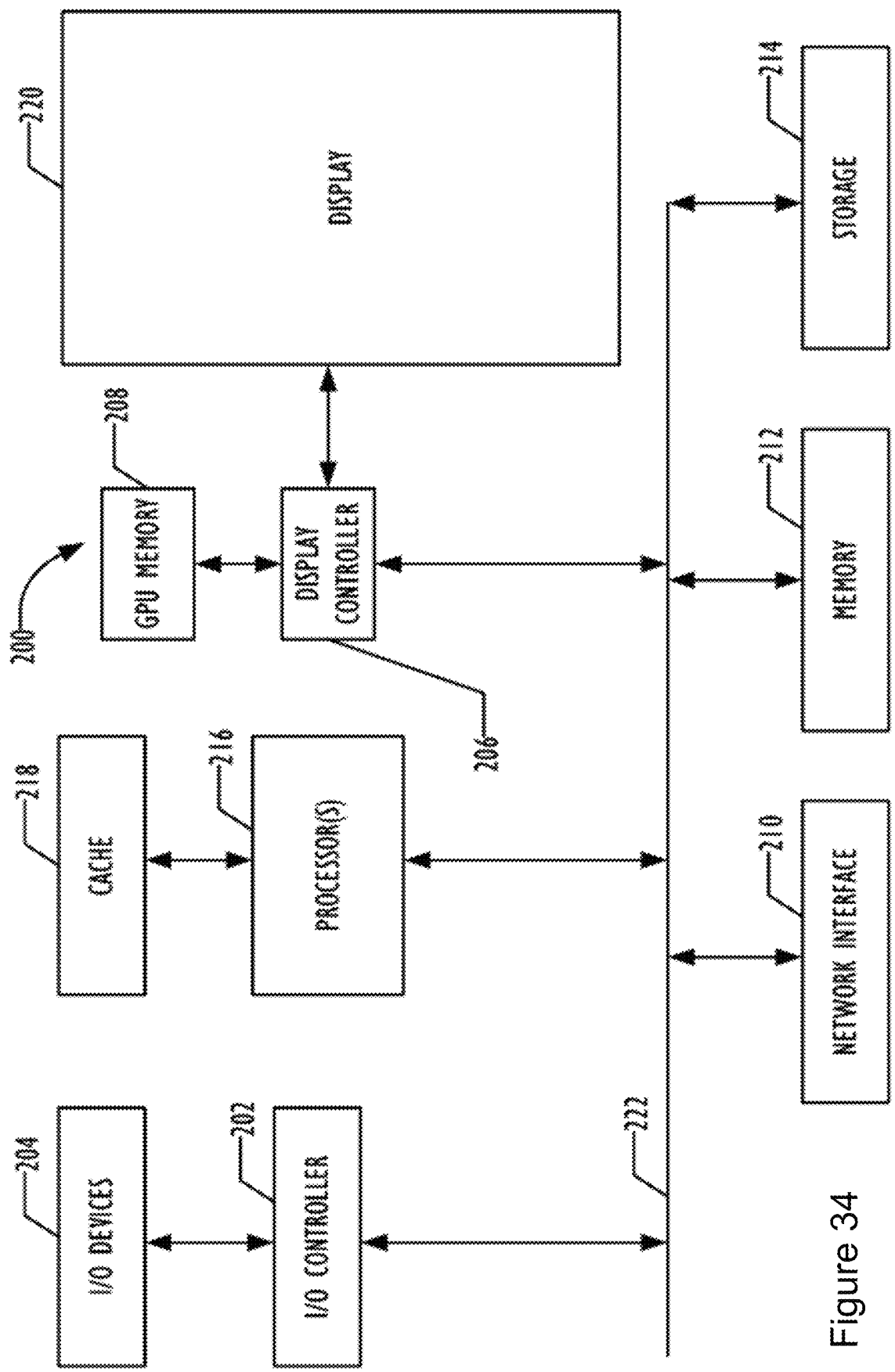
FIG. 34 shows sample hardware.

Referring now to FIG. 34, a block diagram illustrates a computer system 200 that can serve as the developer or end-user system 100 (such as a game system or computer) according to various embodiments. System 100 is provided an exemplary system where software discussed and disclosed in this paper may be created or used. While FIG. 34 illustrates various components of a computer system, it is not intended to represent any particular architecture or manner of interconnecting the components as such details are not germane to the present disclosure. Network computers and other data processing systems (for example, handheld computers, personal digital assistants (PDAs), cellular telephones, entertainment systems, consumer electronic devices, etc.) which have fewer components or perhaps more components may also be used to implement one or more embodiments.

As illustrated in FIG. 34, the computer system 200, which is a form of a data processing system, includes a bus 222 which is coupled to a microprocessor(s) 216, which may be CPUs and/or GPUs, a memory 212, which may include one or both of a volatile read/write random access memory (RAM) and a read-only memory (ROM), and a non-volatile storage device 214. The microprocessor(s) 216 may retrieve instructions from the memory 212 and the storage device 214 and execute the instructions using cache 218 to perform operations described above. The link 222 interconnects these various components together and also interconnects these components 216, 218, 212, and 214 to a display controller 206 and display device 220 and to peripheral devices such as input/output (I/O) devices 204 which may be mice, keyboards, modems, network interfaces, printers and other devices which are well known in the art. Typically, the input/output devices 204 are coupled to the system through input/output controllers 202. Where volatile RAM is included in memory 212, the RAM is typically implemented as dynamic RAM (DRAM), which requires power continually in order to refresh or maintain the data in the memory. The display controller 206 and display device 220 may optionally include one or more GPUs to process display data. Optionally, a GPU memory 208 may be provided to support GPUs included in the display controller 206 or display device 220.

The storage device 214 is typically a magnetic hard drive, an optical drive, a non-volatile solid-state memory device, or other types of memory systems, which maintain data (e.g. large amounts of data) even after power is removed from the system. While FIG. 34 shows that the storage device 214 is a local device coupled directly to the rest of the components in the data processing system, embodiments may utilize a non-volatile memory which is remote from the system, such as a network storage device which is coupled to the data processing system through a network interface 210, which may be a wired or wireless networking interface. The link 222 may include one or more links connected to each other through various bridges, controllers, and/or adapters as is well known in the art. Although only a single element of each type is illustrated in FIG. 34 for clarity, multiple elements of any or all of the various element types may be used as desired.

Figure 35:
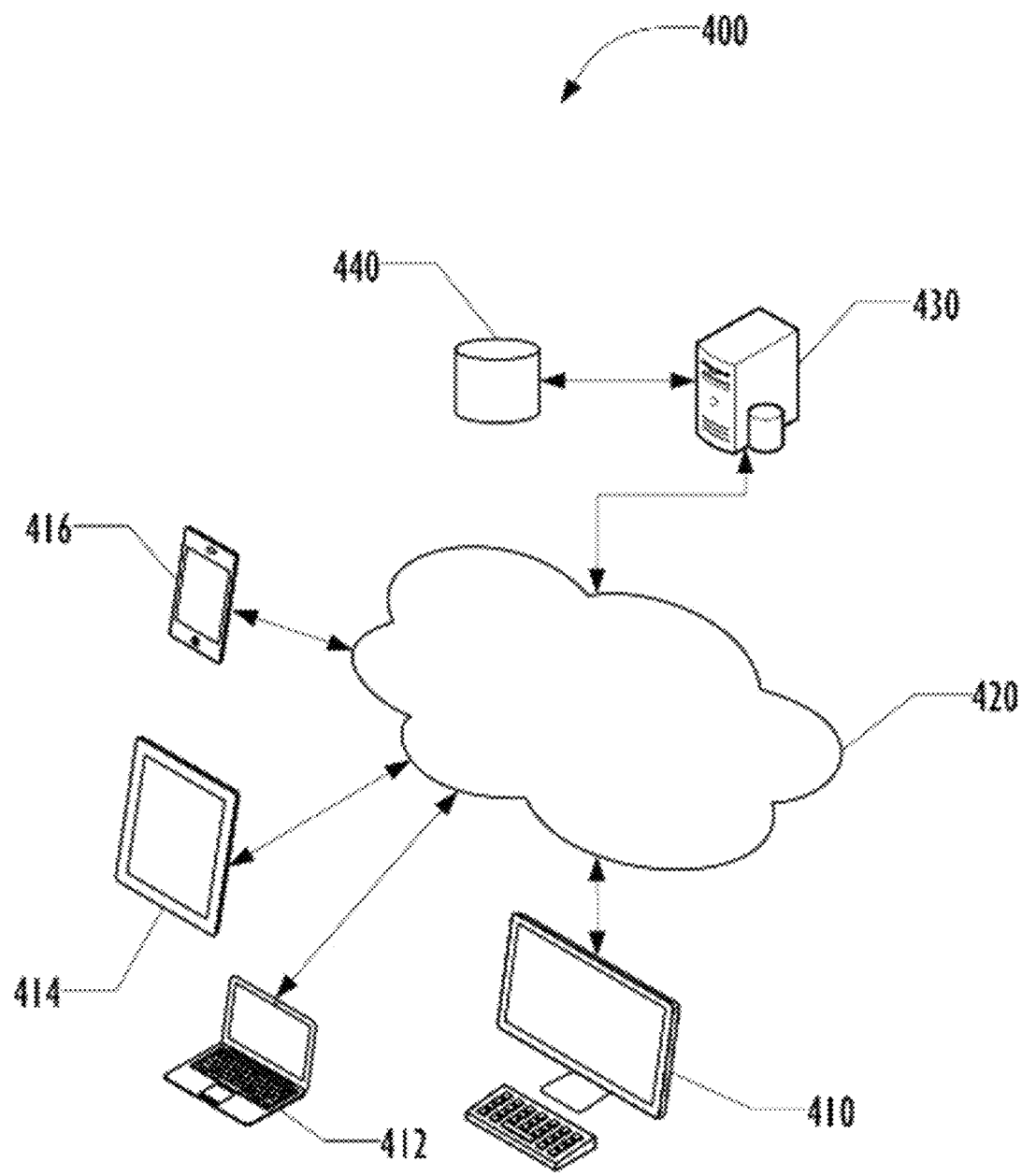
FIG. 35 shows sample networks.

Turning now to FIG. 35, a block diagram illustrates a network of interconnected programmable devices 400, including server 430 and an associated datastore 440, as well as a desktop computer or gaming system 410, a laptop 412, a tablet 414, and a mobile phone 416. Any of these programmable devices may be a developer system or an end-user system. The network 420 that interconnects the programmable devices may be any type of network, wired or wireless, local or wide area, public or private, using any desired network communication protocols for transport of data from one system to the other. Although illustrated as a single network 420, any number of interconnected networks may be used to connect the various programmable devices, which may employ different network technology. In one example, the desktop workstation 410 may be a developer system or cloud-present portions of a game engine, distributing game software to the server 430 or end-user devices (e.g. 410, 414 and 414), which in turn may serve to distribute software such as a game application or resources to multiple devices 412, 414, and 416, each of which may employ a different hardware configurations similar to those disclosed herein.

By way of illustration, many of the software embodiments discussed herein are intended to use hardware in the typical and well-know manner for which software runs on hardware, is manipulated by hardware, or transported by hardware or networks. Thus, the software structures discussed herein, such as APIs and software implemented methods (e.g. shown as methods or processes) will reside in computer readable mediums including volatile and non-volatile memories, and be processed by CPUs or GPUs as appropriate, and transported over networks as appropriate.

Ancillary Information A: Casual Games' Accessibility-Friendly Design

Casual games, such as indie hit Stardew Valley, farming simulation Harvest Moon, and Nintendo's popular social simulation game Animal Crossing: New Horizons, have a reputation of helping players relax and unwind. Gaming researcher Jasper Juul describes a casual game as, "the design does not need to be segmented or repeatable, but the player should be able to easily interrupt the game without serious consequences and return to the session later."

Generally speaking, casual games have simple gameplay and user interfaces, making them easy to understand and playable for most age groups. The Casual Gaming Association even defines casual games as "fun and easy to learn and play" on their archived website. This is part of what made casual games a popular choice for those with motion disabilities—the simplicity of the gameplay allows for navigation with fewer degrees of motion. Casual games are also marked by their ability to play in short sessions because of their aforementioned interruptibility.

Casual game interruptibility offers players a chance to engage in a daily satisfying activity with minimal commitment, or minimal reason to sacrifice other activities. However, not all casual games are truly interruptible. A truly interruptible game allows the player to save their progress and quit at any point, or otherwise offers no consequence for the player suddenly quitting the game.

For example, in Animal Crossing: New Horizons, a player is always one press of a button away from saving and exiting the game. No opportunities will be lost if the player returns at a later time. Animal Crossing: New Horizons even auto-saves during gameplay, so potential progress lost from quitting the game unexpectedly is minimal. The game lacks time-sensitive quests, allowing the player to progress at their own pace.

By contrast, Stardew Valley has only one save point—the player's virtual bed. If a player does not go to their bed to save before quitting, their progress for the day will be lost. Granted, one "day" in Stardew Valley lasts only about 15 minutes, minimizing the amount of progress that can be lost as a player is forced to save exactly one time per day (at the end of each day, when they go to bed). A player cannot save without ending the day, so there is a non-zero opportunity cost to interrupting the game mid-day to save. The consequence for not saving the game or for saving mid-day (therefore ending the day) is fairly minimal, but still more present than Animal Crossing: New Horizons, making Stardew Valley less interruptible.

Casual games and their interruptibility are highly compatible with a happy life, according to McGonigal's four secrets to happiness. This is mainly due to the third secret: social connection.

Consider the following excerpt from McGonigal's Reality is Broken:

"More gaming by more people is the primary goal of the industry. But the industry wants to create lifelong gamers: people who can balance their favorite games with full and active lives . . . Beyond a certain playing threshold—for most gamers, it seems to be somewhere around twenty hours a week—[gamers] start to wonder if they're perhaps missing out on real life."

People who play video games too often or who become addicted to games will certainly start to miss out on real life. While many games allow gamers to connect with other people online, this is not what McGonigal is referring to in her third secret—she clarifies that we gain "a large percentage of our happiness from spending time with the people we care about."

Interruptibility is not the magic-bullet solution to video game addiction, but casual gaming certainly has a case for keeping people involved in real life. Casual games are not designed to be addicting. They are designed for short bursts of low-stakes tasks and entertainment. They are too simple to be fun to play all day. The utterly low commitment to continue gameplay makes putting down the game to join your family at the dinner table much easier. It makes the game something that can be as ornamental to your life as reading a morning newspaper or watching a TV show before bed.

Part of casual game interruptibility means that the game isn't gripping enough to cause players to miss out on real life.

Ancillary Information B: Super Smash Bros. Playable Character Gender Analysis

While studying at Duke, we conducted a brief research project on the Super Smash Bros. series to explore how Nintendo has diversified (or failed to diversify) the playable characters' genders in the Super Smash Bros series over time.

The Super Smash Bros ("SSB") video game series was created by Masahiro Sakurai and published by Nintendo. While SSB is known to have many playable characters, none of these characters are unique to only SSB games. SSB is actually a conglomerate of major characters from many other popular games. The object of SSB is to fight characters (either played by other people or controlled by the computer) to complete challenges and work through stories. SSB has five games in the series and is playable on seven different consoles. Today, tens of millions of copies of SSB have been sold worldwide and there is a large competitive community dedicated to the game.

Before getting started on analysis, there are two things to clarify. The first is that the gender of characters is not always clear. This paper will go over how it was determined the genders of the characters shortly, but it is important to realize that these characters are fictional and not always intended to take on qualities such as gender, race or sexuality. The second is that the inventor adores Nintendo and the Super Smash Bros series. It is with the utmost respect and scholarly curiosity that it was chosen for analysis.

In an effort to make this analysis as simple yet accurate as possible, this paper has broken down the characters into four major gender categories:

Male: For characters that have been identified by their franchise as male.

Female: For characters that have been identified by their franchise as female.

Player's Choice: For characters that could be male or female depending on the choice of the player.

Ambiguous: For genderless characters, or characters who have genders but the gender is not specified. For example, Pokémon are often gendered in the Pokémon series, but whether the player is using a female or a male Pikachu (for example), is not specified in SSB. Ambiguous was also assigned to teams of characters where there was a mix of male and female characters. For example, there is one female and one male Ice Climber. The Ice Climbers were marked as ambiguous because these characters are used together, as a "one character" unit.

Here is a review of some important terminology:

Playable character: These are characters that the player can control during regular gameplay. This is opposed to NPCs, or non-playable characters who cannot be controlled by the player.

DLC: Stands for Downloadable Content. This is extra content that was not included in the purchase of the original game. In the SSB series, players have to pay for DLC, but it is not a reoccurring subscription. Characters are added to the SSB games through DLC. The DLC characters available as of Oct. 13, 2019 are counted in the gender analysis.

That's enough preamble. Onto the good stuff.

Figure 36:
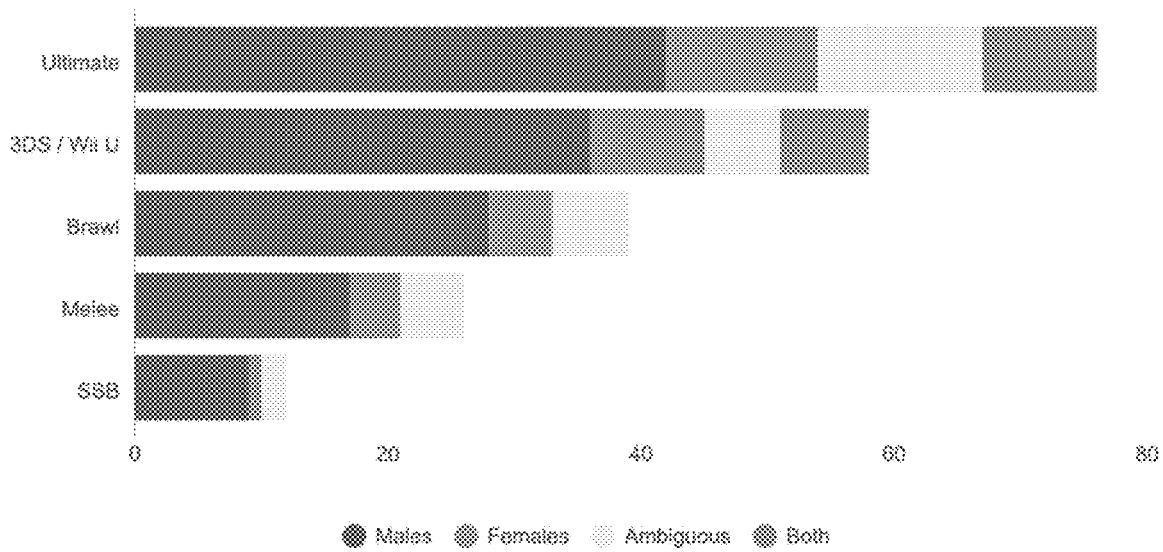
FIG. 36 shows a bar graph illustrating data examined.

The chart of FIG. 36 shows the number of characters by gender in each SSB game. The names of the games have been abbreviated in the chart image, but "SSB" stands for the original Super Smash Bros. for the Nintendo 64. Note that you can see this chart and all of the following charts in their interactive form by visiting the author's personal website.

Figure 37:
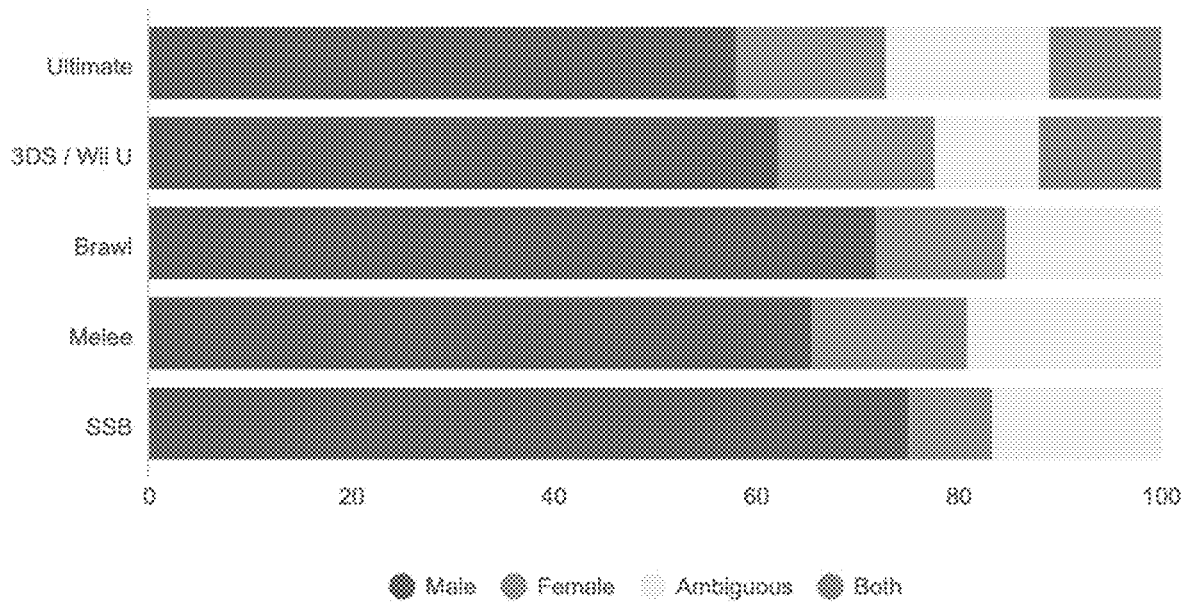
FIG. 37 shows a second bar graph illustrating data examined.

With only the chart displayed above, it is difficult to determine whether or not Nintendo successfully diversified the genders of their playable characters over time. Because of this, a second interactive chart at FIG. 37 was created to show the percentage of each gender category.

Nintendo has steadily improved the gender ratio of the SSB playable characters, and this chart may not give justice to how dramatic of an improvement has been made.

The original SSB game was 75% male, and the most recent SSB game is roughly 58% male. That's a 22.6% decrease, which is impressive considering Nintendo mainly has male-dominated franchises to pick from. Nintendo can't necessarily solve the problem by removing male characters—only by adding female character options and diluting the pool. Nintendo's decision to add more "both" characters to the game is good. Instead of adding only females, Nintendo is giving everyone more options to find characters they identify with by having multiple genders (even non-binary options) available as alternative forms of the same character.

When this project was completed, it was determined that Nintendo was making an honest effort to include more non-male characters in Super Smash Bros. However, this painted an incomplete picture of the progress made on this subject. There is more than what meets the eye.

Although there are technically more non-male playable characters included in SSB, the character roster still looked overwhelmingly masculine. This prompted the next step in this project: determining if Nintendo had successfully included more playable characters that appeared non-male.

Admittedly, this was a less scientific process than when figuring out how many characters were definitively male, female, or neither. Whether or not a character looks like a male is largely an opinion and often relies on stereotypes. However, it is through the lens of these stereotypes and preconceived notions that people make determinations about others such as their age, gender, socioeconomic status, and so on.

Characters were judged to look male, female or ambiguous based on a few visual features:

Color: Characters who were or had clothes in more pastel colors, pinks and purples were considered more feminine. Blues, reds and greens were considered to be more masculine colors, and some colors such as yellow, white and black were considered neutral.

Clothing: Characters wearing dresses, skirts, lace or frills were considered to look feminine. Characters who wore pants but no shirt, or heavily-clad armor were considered to look masculine. Most other clothing was considered neutral.

Bodily features: Characters were considered female if they appeared to have female body parts (such as breasts and wide hips), facial features typically associated with female faces, or long hair. Characters were considered male if they appeared to have a body structure associated with males (such as extremely bulky muscles or a V-shaped figure), facial features typically associated with male faces, or short hair.

Name: Every character in SSB has a name listed under their picture. Names traditionally assigned to men in Western culture were considered to be masculine, and vise versa for women.

Each character was marked as appearing male, female, or ambiguous on the same spreadsheet mentioned previously.

As few characters as possible were marked as ambiguous based on the inventor's criteria. This was an imperfect process and there were some characters that were struggling to label. However, the author made decisions in the most unbiased and scientific way she could by following the above criteria. The following charts of FIGS. 38 and 39 display the results of those efforts.

Figure 38:
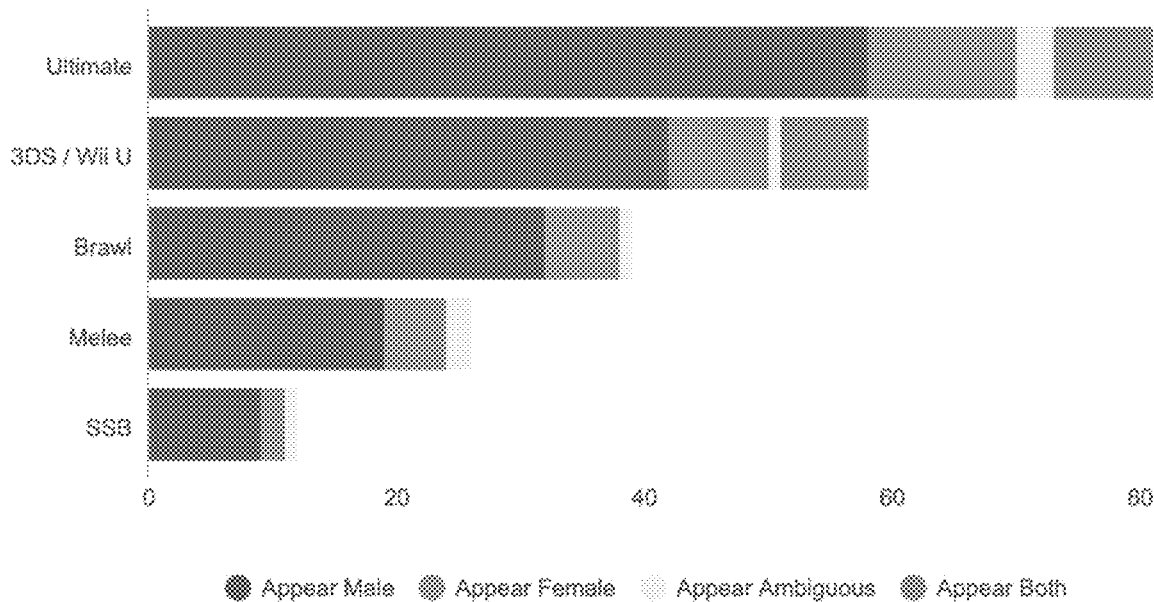
FIG. 38 shows a third bar graph illustrating data examined.
Figure 39:
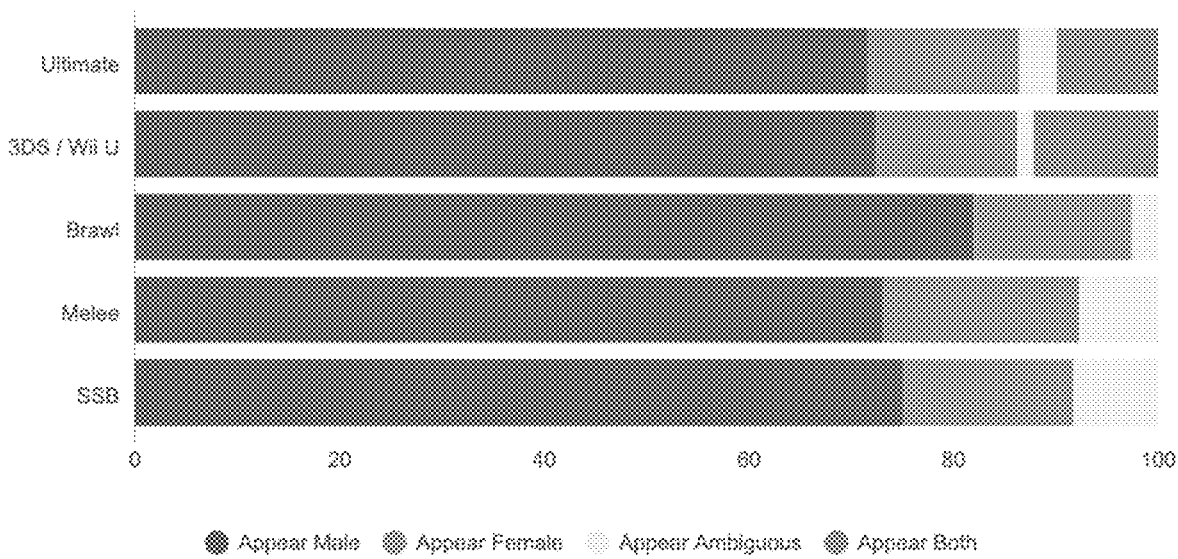
FIG. 39 shows a fourth bar graph illustrating data examined.

The first chart shown in FIG. 38 displays the raw numbers of playable characters as the gender they appear to be in each series.

Again, it is difficult to tell from this graph if there was an improvement in Nintendo adding female-appearing characters over time. A second graph in FIG. 39 was created to show the same data by percentage to make the results more clear.

While there are more characters that are identified by their franchise as female, the Super Smash Bros. playable character roster is still an incredibly masculine-looking space. There has been only a very small improvement over time, with the original SSB appearing 75% male and the most recent edition of the game appearing 71.6% male. Whether or not this difference is significant enough to be noticeable to players is debatable.

With such a noticeable difference in Nintendo advertising over time, expectations were for a more significant change in the characters. Pairing all four graphs together does suggest that Nintendo is being more inclusive to non-male characters by making somewhat masculine or androgynous female characters. For the scope of this project, this paper will not discuss whether or not this is a bad thing for the female gaming community. However, this paper will end on this question—is making a more gender-inclusive video game environment a struggle to invite women into gaming more actively, or a struggle to make men accept that women are already there?

The invention claimed is:

1. A method comprising:
using one or more APIs of a first type to interface with an authority on at least one video game, said APIs of a first type enabling collection of information regarding a portion of a particular video game and wherein the information regarding the portion of the particular video game comprises:
a plurality of controls required to play the portion of the particular video game and for each of said controls required to play the portion of the particular video game,
whether the control is binary or non-binary,
information regarding the frequency of expected use for the control, and
information defining the uses of the control in combination with any other controls, including at least the identity of said other controls;
using one or more APIs of a second type to interface with an authority on hands-free hardware that provides accessibility functionality, said APIs of a second type enabling collection of information regarding that status of hands-free user gestures;
using one or more APIs of a third type to interface with an authority on gesture capabilities or preferences of one or more particular users; and
developing a customized correlation of available user gestures, hardware and controls for a particular user to play a portion of the particular video game,
wherein the APIs of a first type, APIs of a second type and APIs of a third type collectively allow assembling information for use to customize a correlation of user gestures, hardware and controls for a particular user to play a portion of the particular video game.

2. The method of claim 1 wherein the authority on at least one video game is software associated with the at least one video game, including without limitation, video game software itself, or video game engine software, or a data repository regarding usage of the at least one video game.

3. The method of claim 1 wherein the authority on hands-free hardware that provides accessibility functionality is either accessibility hardware itself or a repository of data comprising information regarding one or more items of accessibility hardware.

4. The method of claim 3 wherein the accessibility hardware is either a hardware device such as a sensor or a virtual reality headset, or a repository of data regarding hardware devices.

5. The method of claim 1 wherein said portion of a particular video game is a game mode.

6. The method of claim 1 wherein the authority on gesture capabilities or preferences of one or more particular users is either
the output of a game that assesses user abilities; or
a repository of data regarding user abilities.

7. Non-transitory machine readable media having stored thereon instructions for performing a method of correlating available user gestures, hardware and controls for a particular user to play a portion of a particular video game, that when executed by a processor in a computer, cause the computer to:
use one or more APIs of a first type to interface with an authority on at least one video game, said APIs of a first type enabling collection of information regarding a portion of a particular video game and wherein the information regarding the portion of the particular video game comprises:
a plurality of controls required to play the portion of the particular video game and for each of said controls required to play the portion of the particular video game,
whether the control is binary or non-binary,
information regarding the frequency of expected use for the control, and
information defining the uses of the control in combination with any other controls, including at least the identity of said other controls;
use one or more APIs of a second type to interface with an authority on hands-free hardware that provides accessibility functionality, said APIs of a second type enabling collection of information regarding that status of hands-free user gestures;
use one or more APIs of a third type to interface with an authority on gesture capabilities or preferences of one or more particular users; and
develop a customized correlation of available user gestures, hardware and controls for a particular user to play a portion of the particular video game,
wherein the APIs of a first type, APIs of a second type and APIs of a third type collectively allow assembling information for use to customize a correlation of user gestures, hardware and controls for a particular user to play a portion of the particular video game.

8. The non-transitory machine readable media of claim 7 wherein the authority on at least one video game is software associated with the at least one video game, including without limitation, video game software itself, or video game engine software, or a data repository regarding usage of the at least one video game.

9. The non-transitory machine readable media of claim 7 wherein the authority on hands-free hardware that provides accessibility functionality is either accessibility hardware itself or a repository of data comprising information regarding one or more items of accessibility hardware.

10. The non-transitory machine readable media of claim 9 wherein the accessibility hardware is either a hardware device such as a sensor or a virtual reality headset, or a repository of data regarding hardware devices.

11. The non-transitory machine readable media of claim 7 wherein said portion of a particular video game is a game mode.

12. The non-transitory machine readable media of claim 7 wherein the authority on gesture capabilities or preferences of one or more particular users is either
the output of a game that assesses user abilities; or
a repository of data regarding user abilities.

13. A computing device comprising:
at least one memory storing machine readable instructions for causing a processor to perform a method of correlating available user gestures, hardware and controls for a particular user to play a portion of a particular video game; and
at least one processor coupled to the at least one memory, the at least one processor configured to execute the machine readable instructions to cause the at least one processor to:
use one or more APIs of a first type to interface with an authority on at least one video game, said APIs of a first type enabling collection of information regarding a portion of a particular video game and wherein the information regarding the portion of the particular video game comprises:
a plurality of controls required to play the portion of the particular video game and for each of said controls required to play the portion of the particular video game,
whether the control is binary or non-binary,
information regarding the frequency of expected use for the control, and
information defining the uses of the control in combination with any other controls, including at least the identity of said other controls;
use one or more APIs of a second type to interface with an authority on hands-free hardware that provides accessibility functionality, said APIs of a second type enabling collection of information regarding that status of hands-free user gestures;
use one or more APIs of a third type to interface with an authority on gesture capabilities or preferences of one or more particular users; and
develop a customized correlation of available user gestures, hardware and controls for a particular user to play a portion of the particular video game,
wherein the APIs of a first type, APIs of a second type and APIs of a third type collectively allow assembling information for use to customize a correlation of user gestures, hardware and controls for a particular user to play a portion of the particular video game.

14. The computing device of claim 13 wherein the authority on at least one video game is software associated with the at least one video game, including without limitation, video game software itself, or video game engine software, or a data repository regarding usage of the at least one video game.

15. The computing device of claim 13 wherein the authority on hands-free hardware that provides accessibility functionality is either accessibility hardware itself or a repository of data comprising information regarding one or more items of accessibility hardware.

16. The computing device of claim 15 wherein the accessibility hardware is either a hardware device such as a sensor or a virtual reality headset, or a repository of data regarding hardware devices.

17. The computing device of claim 13 wherein said portion of a particular video game is a game mode.

18. The computing device of claim 13 wherein the authority on gesture capabilities or preferences of one or more particular users is either
the output of a game that assesses user abilities; or
a repository of data regarding user abilities.

* * * * *